US012104405B2

(12) United States Patent
Huang

(10) Patent No.: US 12,104,405 B2
(45) Date of Patent: Oct. 1, 2024

(54) DOOR LOCK PERMITTING ELECTRIC LOCKING AND UNLOCKING

(71) Applicant: I-TEK METAL MFG. CO., LTD, Tainan (TW)

(72) Inventor: Tsung-Yu Huang, Tainan (TW)

(73) Assignee: I-TEK METAL MFG. CO., LTD., Tainan (TW)

( * ) Notice: Subject to any disclaimer, the term of this patent is extended or adjusted under 35 U.S.C. 154(b) by 305 days.

(21) Appl. No.: 17/828,125

(22) Filed: May 31, 2022

(65) Prior Publication Data

US 2023/0374820 A1 Nov. 23, 2023

(30) Foreign Application Priority Data

May 23, 2022 (TW) .................................. 111119042

(51) Int. Cl.

*E05B 47/00* (2006.01)
*E05B 47/06* (2006.01)
*E05B 63/08* (2006.01)
*E05B 63/16* (2006.01)

(52) U.S. Cl.

CPC ...... *E05B 47/0012* (2013.01); *E05B 47/0673* (2013.01); *E05B 63/16* (2013.01); *E05B 2047/0017* (2013.01); *E05B 2047/0068* (2013.01); *E05B 2047/0069* (2013.01); *E05B 63/08* (2013.01)

(58) Field of Classification Search

CPC ............. E05B 47/0012; E05B 47/0665; E05B 47/0673; E05B 63/08; E05B 63/16; E05B 2047/0017

See application file for complete search history.

(56) References Cited

U.S. PATENT DOCUMENTS

| | | | |
|---|---|---|---|
| 6,177,771 | B1 | 1/2001 | Kinzer et al. |
| 6,634,140 | B1 | 10/2003 | Sellman |
| 6,786,006 | B2 | 9/2004 | Kowalczyk et al. |
| 6,891,479 | B1 | 5/2005 | Eccleston |
| 7,051,403 | B2 | 5/2006 | Homberg |
| 7,061,197 | B1 | 6/2006 | Mullet et al. |
| 7,068,179 | B2 | 6/2006 | Snell et al. |
| 7,143,547 | B2 | 12/2006 | Liles, Jr. |
| 7,234,201 | B2 | 6/2007 | Brown et al. |
| 7,282,883 | B2 | 10/2007 | Mullet et al. |

(Continued)

FOREIGN PATENT DOCUMENTS

| | | | |
|---|---|---|---|
| CN | 110424823 A | * 11/2019 | ............. E05B 15/00 |
| EP | 3460149 B1 | * 11/2019 | ......... E05B 47/0615 |

*Primary Examiner* — Christine M Mills

*Assistant Examiner* — Peter H Watson

(74) *Attorney, Agent, or Firm* — Ying-Ting Chen; Law Office of Michael Chen

(57) ABSTRACT

A door lock includes a latch slideably received in a case and an unlocking mechanism mounted in the case and operatively connected to the latch for moving the latch between a latching position and an unlatching position. The unlocking mechanism includes an unlocking mechanism having a shaft for moving a locking member between a front position in which the unlocking mechanism is locked and a rear position in which the unlocking mechanism is not locked. The shaft can be driven by a motor through wired or wireless control to rotate in a forward direction or reverse direction for locking or unlocking purposes.

5 Claims, 17 Drawing Sheets

(56) References Cited

U.S. PATENT DOCUMENTS

| | | | |
|---|---|---|---|
| 7,296,380 | B2 | 11/2007 | Backman |
| 7,316,096 | B2 | 1/2008 | Houser et al. |
| 7,418,800 | B1 | 9/2008 | Sellman |
| 7,484,333 | B2 | 2/2009 | Houser et al. |
| 7,555,867 | B2 | 7/2009 | Liles, Jr. |
| 7,717,155 | B2 | 5/2010 | Mullet |
| 7,774,984 | B2 | 8/2010 | Hsu |
| 7,966,771 | B2 | 6/2011 | Bienek |
| 8,109,038 | B2 | 2/2012 | Houser et al. |
| 8,169,169 | B2 | 5/2012 | Hass et al. |
| 8,248,005 | B2 | 8/2012 | Romer |
| 8,390,219 | B2 | 3/2013 | Houser |
| 8,393,054 | B2 | 3/2013 | Bienek |
| 8,407,937 | B2 | 4/2013 | Houser |
| 8,415,902 | B2 | 4/2013 | Burris et al. |
| 8,434,268 | B2 | 5/2013 | Nixon |
| 8,499,495 | B2 | 8/2013 | Houser et al. |
| 8,547,046 | B2 | 10/2013 | Burris et al. |
| 8,601,744 | B2 | 12/2013 | Wildforster et al. |
| 8,695,277 | B2 | 4/2014 | Romer et al. |
| 8,826,598 | B2 | 9/2014 | Ranaudo et al. |
| 8,875,344 | B2 | 11/2014 | Salutzki et al. |
| 8,904,710 | B2 | 12/2014 | Romer et al. |
| 8,963,683 | B2 | 2/2015 | Romer |
| 9,003,630 | B2 | 4/2015 | Hufen |
| 9,045,927 | B1 | 6/2015 | Hoffberg |
| 9,097,051 | B2 | 8/2015 | Hellwig |
| 9,115,526 | B2 | 8/2015 | Houser et al. |
| 9,121,217 | B1 | 9/2015 | Hoffberg |
| 9,163,446 | B2 | 10/2015 | Houser et al. |
| 9,181,744 | B2 | 11/2015 | Salutzki et al. |
| 9,187,942 | B2 | 11/2015 | Wildforster |
| 9,297,194 | B2 | 3/2016 | Bienek et al. |
| 9,506,284 | B2 | 11/2016 | Braverman et al. |
| 9,514,583 | B2 | 12/2016 | Zasowski et al. |
| 9,631,412 | B2 | 4/2017 | Hellwig et al. |
| 9,683,378 | B2 | 6/2017 | Houser et al. |
| 9,695,620 | B2 | 7/2017 | Zasowski et al. |
| 9,869,117 | B2 | 1/2018 | Houser et al. |
| 9,995,076 | B1 | 6/2018 | Hoffberg |
| 10,006,236 | B2 | 6/2018 | Hellwig et al. |
| 10,024,094 | B2 | 7/2018 | Bell et al. |
| 10,030,425 | B2 | 7/2018 | Zasowski et al. |
| 10,030,426 | B2 | 7/2018 | Langenberg |
| 10,077,591 | B2 | 9/2018 | Hass |
| 10,180,023 | B2 | 1/2019 | Zasowski et al. |
| 10,208,520 | B2 | 2/2019 | Long et al. |
| 10,236,801 | B2 | 3/2019 | Dye et al. |
| 10,253,540 | B2 | 4/2019 | Bell et al. |
| 10,280,670 | B2 | 5/2019 | Roberts |
| 10,280,678 | B1 | 5/2019 | Rendon, Jr. et al. |
| 10,304,272 | B2 | 5/2019 | Kvinge et al. |
| 10,344,502 | B2 | 7/2019 | McKibben et al. |
| 10,415,301 | B2 | 9/2019 | Kuan |
| 10,472,873 | B2 | 11/2019 | Ladha et al. |
| 10,559,151 | B2 | 2/2020 | Kvinge et al. |
| 10,704,310 | B1 | 7/2020 | Barbon et al. |
| 10,704,313 | B2 | 7/2020 | Houser et al. |
| 10,724,288 | B2 | 7/2020 | Baumgarte |
| 2005/0154612 | A1 | 7/2005 | Smith et al. |
| 2007/0256362 | A1 | 11/2007 | Hansen |
| 2013/0009785 | A1 | 1/2013 | Finn et al. |
| 2014/0255252 | A1 | 9/2014 | Stratman et al. |
| 2016/0153213 | A1 * | 6/2016 | Huang .................... E05B 55/12 292/144 |
| 2016/0160530 | A1 * | 6/2016 | Shen ..................... H02J 7/0042 292/138 |
| 2016/0348415 | A1 | 12/2016 | Baumgarte |
| 2018/0334841 | A1 | 11/2018 | Langenberg et al. |
| 2019/0043296 | A1 | 2/2019 | Baumgarte et al. |
| 2019/0145138 | A1 | 5/2019 | Eickhoff |
| 2019/0153764 | A1 | 5/2019 | Baumgarte |
| 2019/0264486 | A1 | 8/2019 | Toloday et al. |
| 2019/0319557 | A1 | 10/2019 | Dye et al. |
| 2019/0338576 | A1 | 11/2019 | Wang |
| 2019/0345738 | A1 | 11/2019 | McKibben et al. |
| 2019/0383080 | A1 | 12/2019 | Barbon et al. |
| 2020/0190885 | A1 | 6/2020 | Coleman |
| 2020/0256108 | A1 | 8/2020 | Shetty et al. |
| 2021/0023248 | A1 | 1/2021 | Townsend et al. |
| 2021/0056791 | A1 | 2/2021 | Shen |

* cited by examiner

DOOR LOCK PERMITTING ELECTRIC LOCKING AND UNLOCKING

BACKGROUND OF THE INVENTION

The present invention relates to a door lock with an electric locking function and, more particularly, to a door lock that can be electrically locked by actuating an electric driving device of the door lock through wired or wireless control, preventing movement of a latch from a latching position to an unlatching position by operating an outer handle.

A type of door locks includes a latch device having a latch mounted in a door and includes inner and outer operating devices mounted to inner and outer sides of the door for driving the latch from a latching position to an unlatching position. A lock core is mounted to the outer side of the door and can be used to lock the latch device to prevent movement of the latch from the latching position to the unlatching position by operating the outer operating device while permitting unlatching operation of the latch by the inner operating device. Thus, unauthorized access to the door can be avoided by manual operation.

Due to improvement of techniques, prevention of unauthorized access to the door can cooperate with an electric burglarproof system or an electric control system. Specifically, the door can be operated by the electric burglarproof system or the electric control system, and the status of the door can be fed back to the electric burglarproof system or the electric control system. Conventional mechanical door locks cannot lock the door by wired or wireless control. In view of this drawback, a door lock with a locking function by using a solenoid switch connected to the latch device is proposed. However, if the power supply is out, the door lock may be changed from the locking state into the unlocking state or vice versa. Thus, a need exists for a reliable door lock that mitigates and/or obviates the above disadvantages.

BRIEF SUMMARY OF THE INVENTION

To solve the above drawbacks, in an aspect, the present invention provides a door lock permitting electric locking and unlocking. The door lock includes:

a case;

a latch slideably received in the case, wherein the latch is movable between a latching position and an unlatching position;

an unlatching mechanism including a first driven ring and a second driven ring, wherein the first driven ring and the second driven ring are independently and operatively connected to the latch;

a first operating device disposed on a side of the case and operatively connected to the first driven ring, wherein the first operating device is operable to pivot the first driven ring to thereby move the latch from the latching position to the unlatching position;

a second operating device disposed on another side of the case and operatively connected to the second driven ring, wherein the second operating device is operable to pivot the second driven ring to thereby move the latch to the latching position or the unlatching position;

a base securely mounted in the case;

a first unit slideably mounted on the base, wherein the first unit is movable between a front position and a rear position;

a second unit engageable with the first unit to move jointly, wherein the second unit is movable relative to the first unit between a first alignment position in which the second unit is aligned with the first driven ring and is spaced from the second driven ring and a second alignment position in which the second unit is aligned with the second driven ring and is spaced from the first driven ring, wherein when the first unit is in the rear position, the first and second operating devices and the first and second driven rings are permitted to move the latch to the unlatching position, wherein when the first unit is in the front position and the second unit is in the first alignment position, the first operating device and the first driven ring are not permitted to move the latch to the unlatching position, whereas the second operating device and the second driven ring are permitted to move the latch to the unlatching position, wherein when the first unit is in the front position and the second unit is in the second alignment position, the second operating device and the second driven ring are not permitted to move the latch to the unlatching position, whereas the first operating device and the first driven ring are permitted to move the latch to the unlatching position:

a motor mounted on the base;

a shaft operatively coupled with the motor and including a threaded section on an outer periphery of the shaft;

an interlocking member movably mounted on the base, wherein the interlocking member is operatively coupled with the first and second operating units, such that movement of the interlocking member causes movement of the first and second units to the front position or the rear position; and a helical elastic element non-rotatably mounted around the outer periphery of the shaft and in threading connection with the threaded section, wherein the helical elastic element is operatively coupled with the interlocking member, such that rotation of the shaft causes movement of the helical elastic element in an axial direction of the shaft, and the interlocking member is pushed to move in the axial direction of the shaft.

The locking mechanism permits wired or wireless control to activate the motor, controlling the locking member to be in the front position (in which the door lock is set to be in the locking state) or the rear position (in which the door lock is set to be in the unlocking state), which is advantageous to cooperate with a control system, such as a door access control system or a burglarproof system. Furthermore, the locking mechanism is simple in the overall structure thereof, which means a lower damage possibility and simpler manufacture and processing of parts. Furthermore, the time required for assembly can be effectively shortened, reducing the overall manufacturing costs.

In an example, the first unit includes two outer faces spaced from each other and a sliding groove extending from one of the two outer faces through the other of the two outer faces. The first unit further includes a first front face and a second front face. The sliding groove extends to the second front face of the first unit. The second unit further includes an outer face and an inner face. The second unit further includes a sliding coupling portion slideably coupled with the sliding groove. The first front face of the first unit is spaced from the inner face of the second unit. The second front face of the first unit abuts the inner face of the second unit. The interlocking member includes a push end abutting the inner face of the second unit and the first front face of the first unit. The second unit in the second alignment position is between the two outer faces of the first unit.

In an example, wherein the first driven ring includes a first protrusion on an outer periphery thereof. The second driven ring includes a first projection on an outer periphery thereof. The second unit includes a locking groove on the outer face. When the first unit is in the front position and the second unit is in the first alignment position, the first protrusion of the first driven ring engages with the locking groove, such that the first driven ring is not pivotable. When the first unit is in the front position and the second unit is in the second alignment position, the first projection of the second driven ring engages with the locking groove, such that the second driven ring is not pivotable.

In an example, the interlocking member includes a body and a push end extending outward from the body. The body includes a chamber receiving the threaded section of the shaft. The helical elastic element is located in the chamber. The push end is operatively coupled with the first unit and the second unit.

In an example, the interlocking member further includes first and second walls which are symmetrically disposed and which are contiguous to the chamber. The first wall includes a first pivotal groove receiving the shaft. The second wall includes a second pivotal groove receiving the shaft. The threaded section of the shaft is located between the first and second walls. The threaded section has one or two turns, wherein the helical elastic element includes a first tang and a second tang tangentially extend from two ends of helical elastic element, respectively. The first tang is located between the first wall and the threaded section in the transverse direction. The second tang is located between the second wall and the threaded section in the transverse direction. The first and second tangs abut inner walls of the chamber, such that the helical elastic element cannot rotate. When the first tang presses against the first wall, the first and second units are permitted to move towards the rear position. When the second tang presses against the second wall, the first and second units are permitted to move towards the front position. When the shaft rotates and the interlocking member is not movable in the transverse direction, a portion of the helical elastic element between the threaded section and the first wall is compressed or another portion of the helical elastic element between the threaded section and the second wall is compressed.

The locking mechanism permits mistaken operation. Namely, when the locking member cannot move, the motor can still be activated to rotate the shaft in either of the forward direction and reverse direction, preventing the motor from being damaged by the resistance. Furthermore, assume the shaft rotates in the forward or reverse direction while the locking member cannot move, since the helical elastic element is compressed, when the factor of blocking of the locking member vanishes (such as release of the first handle or the second handle, which is on the outer side), bias of the helical elastic element causes movement of the interlocking member, which, in turn, moves the locking member to the predetermined, controlled rear position or front position, avoiding unreliable setting of the door lock in the locking or unlocking state due to mistaken operation.

In an example, the door lock further includes a supporting member mounted to the base and spaced from the interlocking member in the axial direction of the shaft. The supporting member includes a pivotal portion, wherein the shaft includes a driven end coupled with the motor to rotate therewith and a supporting end rotatably coupled with the pivotal portion of the supporting member. The threaded section is located between the driven end and the supporting end. The driven end and the supporting end are located outside of the interlocking member.

In another aspect, the present invention provides a door lock permitting electric locking and unlocking. The door lock includes:

- a case;
- a latch slideably received in the case, wherein the latch is movable between a latching position and an unlatching position;
- an unlatching mechanism pivotably coupled with the case and operatively connected to the latch, wherein the unlatching mechanism is configured to move the latch to the latching position or the unlatching position;
- a base securely mounted in the case;
- a locking member movably disposed on the base, wherein the locking member is movable between a front position and a rear position, wherein when the locking member is in the rear position, the unlocking mechanism is permitted to move the latch from the latching position to the unlatching position, and wherein when the locking member is in the front position, the unlocking mechanism is not permitted to move the latch from the latching position to the unlatching position;
- a motor mounted on the base;
- a shaft operatively coupled with the motor and including a threaded section on an outer periphery of the shaft;
- an interlocking member movably mounted on the base, wherein the interlocking member is operatively coupled with the locking member, such that movement of the interlocking member causes movement of the locking member to the front position or the rear position; and
- a helical elastic element non-rotatably mounted around the outer periphery of the shaft and in threading connection with the threaded section, wherein the helical elastic element is operatively coupled with the interlocking member, such that rotation of the shaft causes movement of the helical elastic element in an axial direction of the shaft, and the interlocking member is pushed to move in the axial direction of the shaft.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

Figure 1:
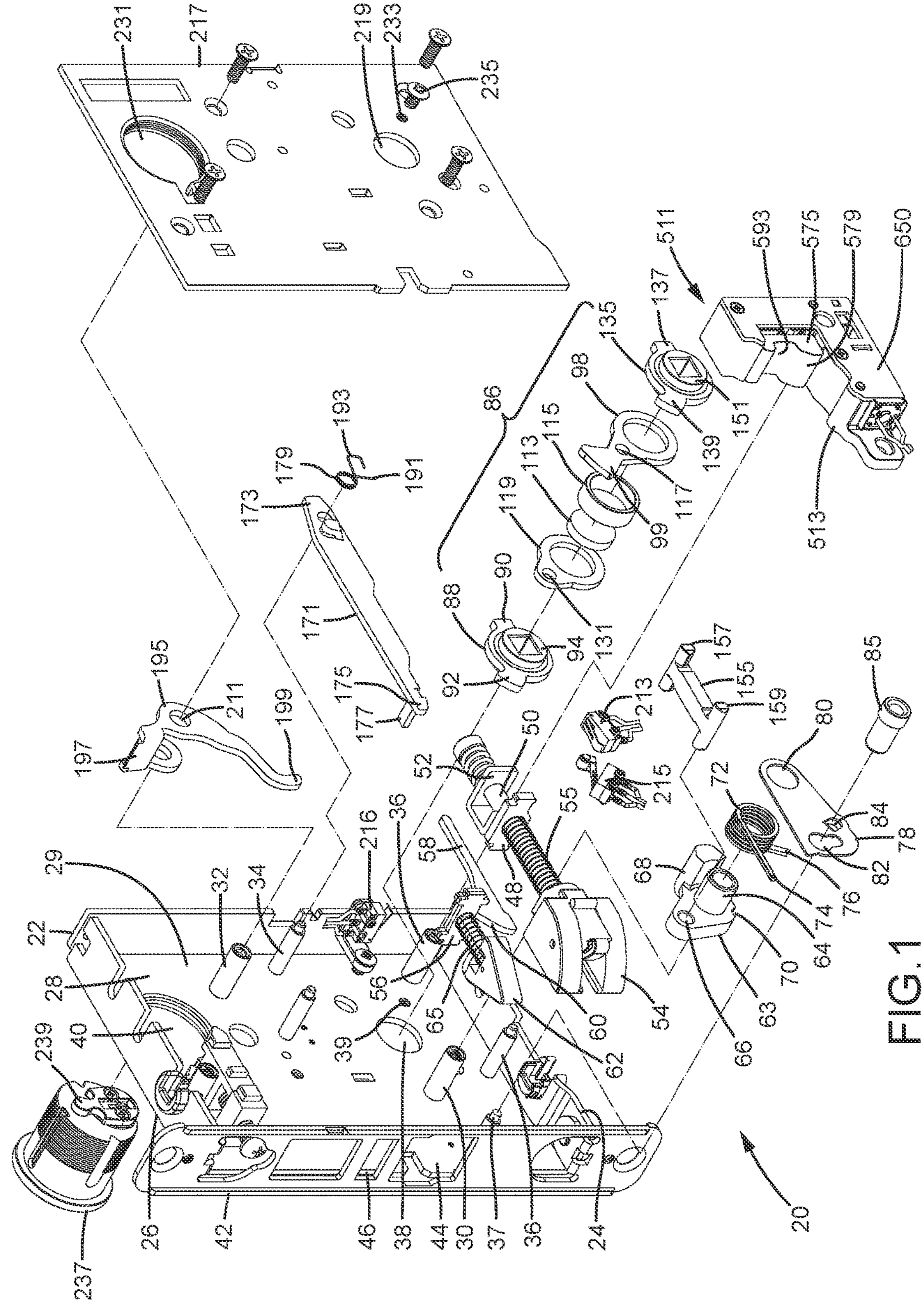
FIG. 1 is an exploded, perspective view of an embodiment of a door lock according to the present invention.
Figure 2:
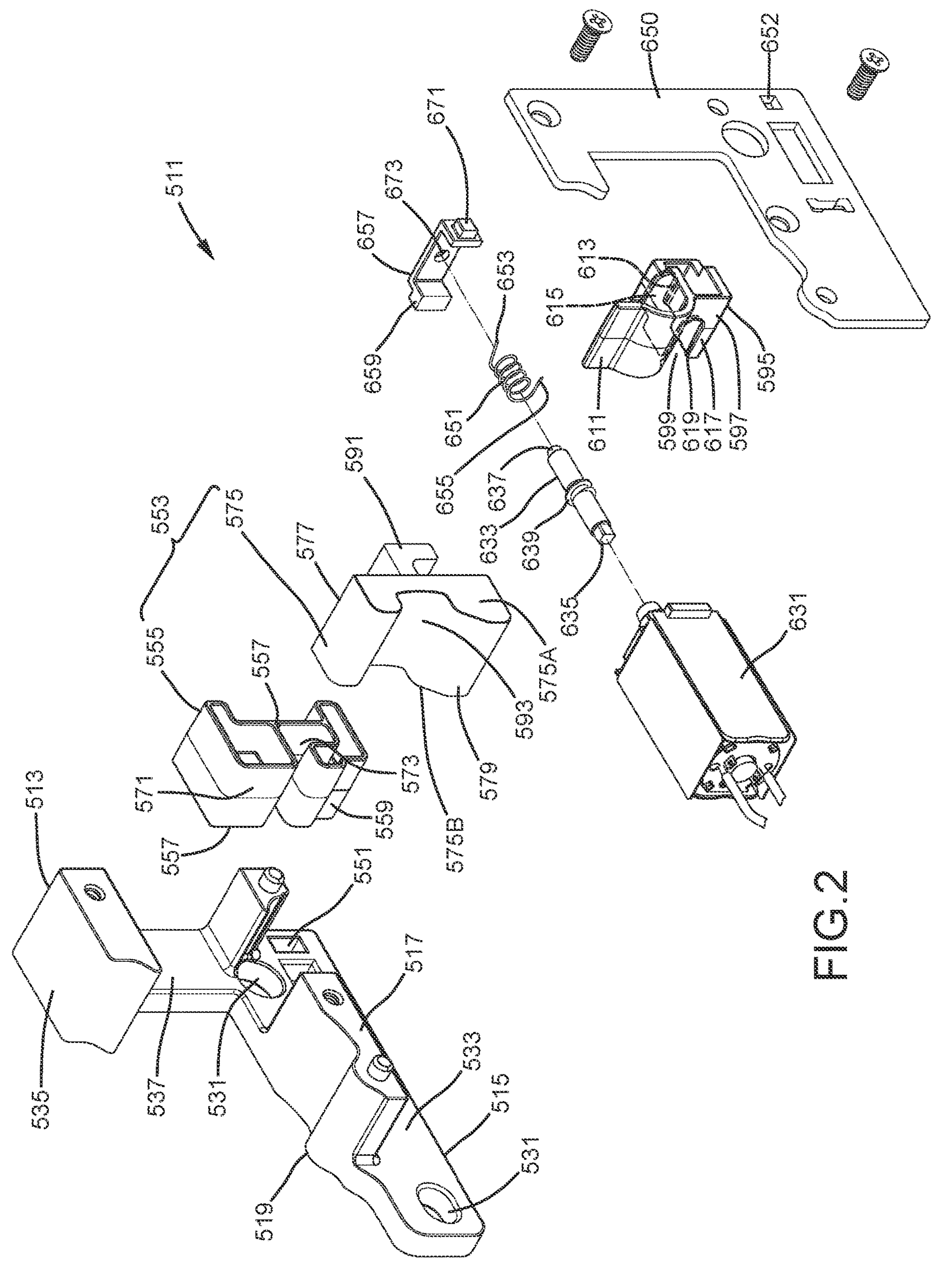
FIG. 2 is an exploded, perspective view of a locking mechanism of the door lock of FIG. 1.
Figure 3:
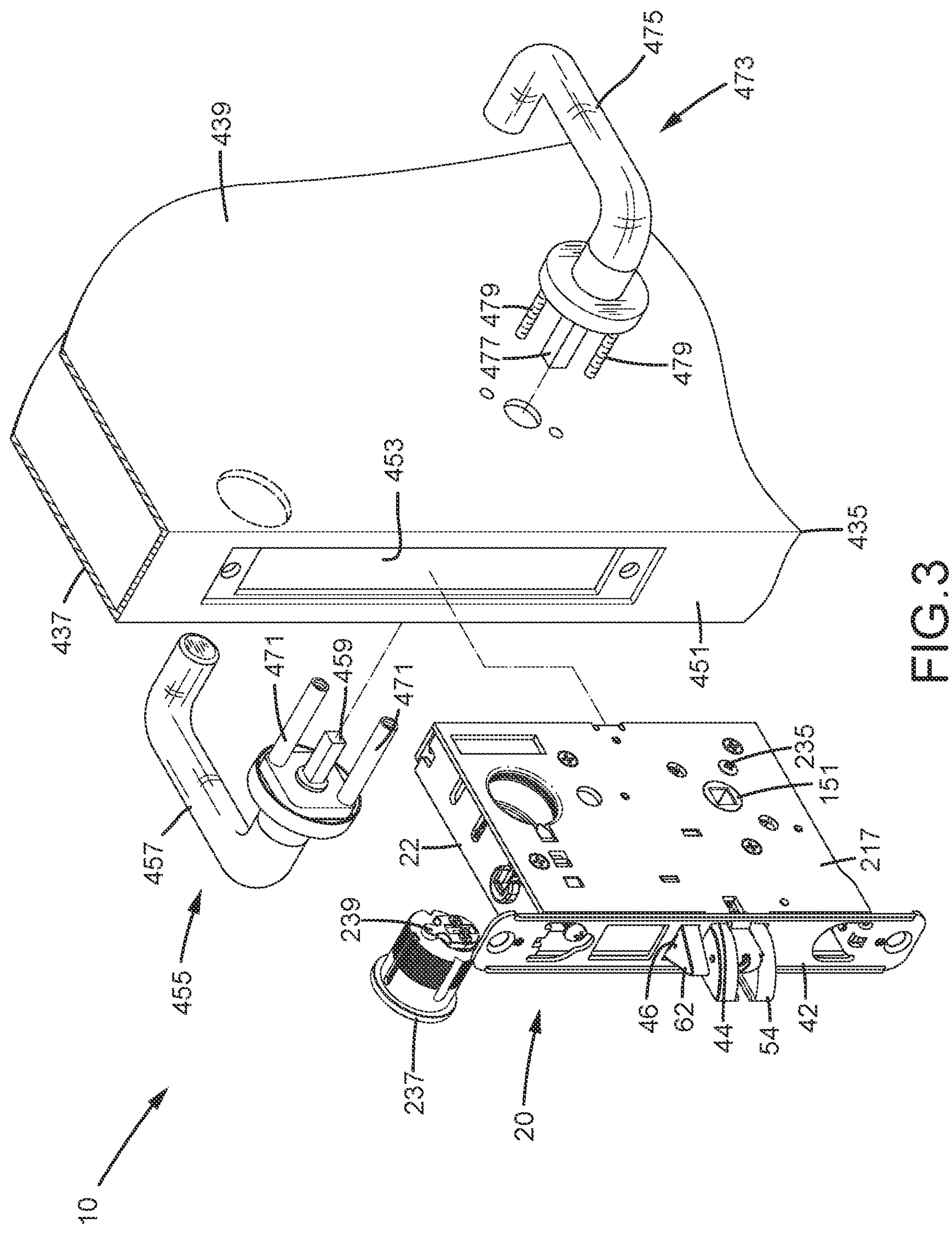
FIG. 3 is a partly exploded perspective view of the lock deice of FIG. 1 and a door to which the lock is mounted.
Figure 4:
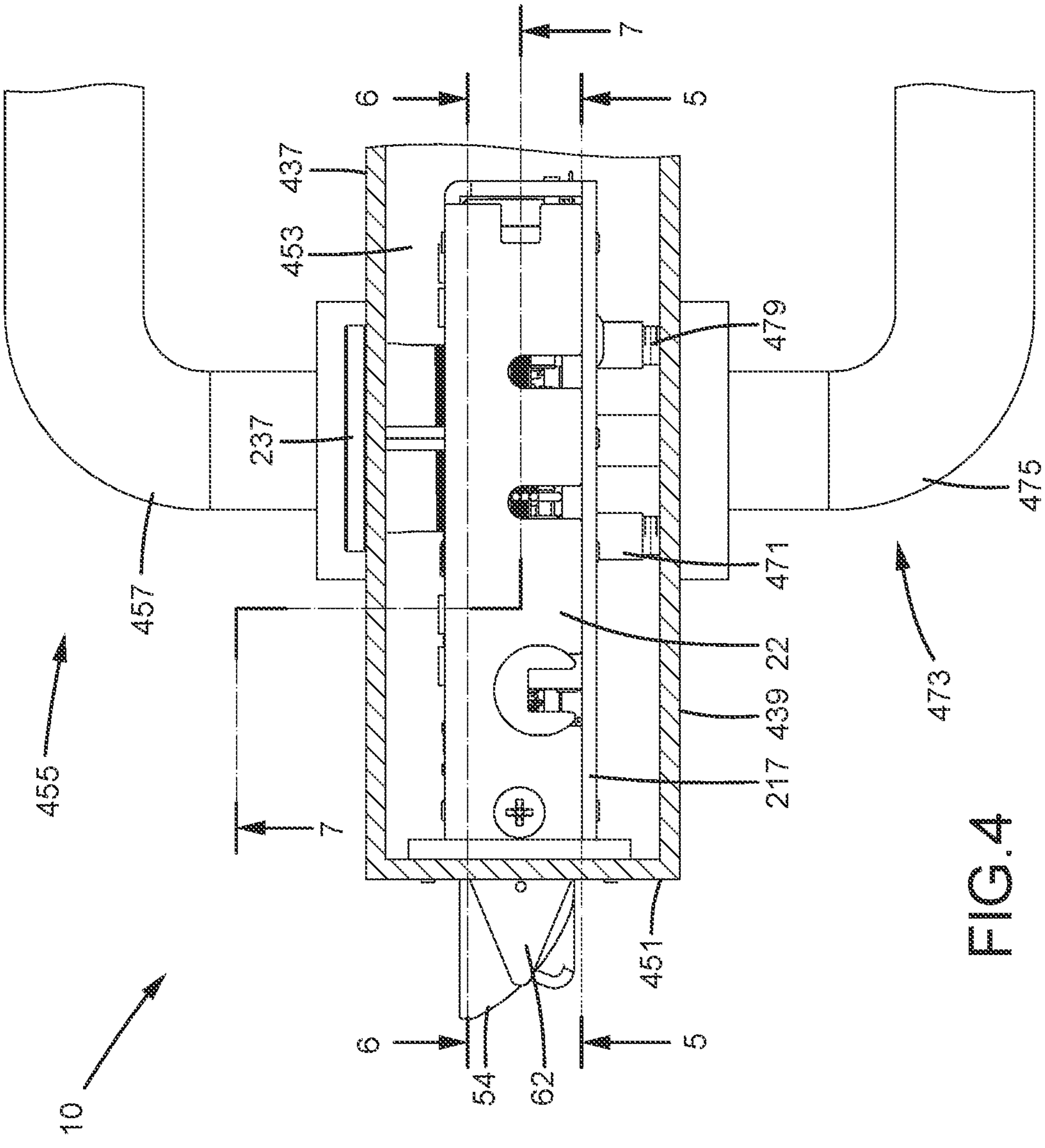
FIG. 4 is a cross sectional view of the door lock and the door of FIG. 3 according to a horizontal section plane.

All figures are drawn for ease of explanation of the basic teachings only; the extensions of the figures with respect to number, position, relationship, and dimensions of the parts to form the illustrative embodiments will be explained or will be within the skill of the art after the following teachings have been read and understood. Further, the exact dimensions and dimensional proportions to conform to specific force, weight, strength, and similar requirements will likewise be within the skill of the art after the following teachings have been read and understood.

Where used in the various figures of the drawings, the same numerals designate the same or similar parts. Furthermore, when the terms “first”, “second”, “third”, “bottom”, “side”, “end”, “portion”, “section”, “front”, “rear”, “horizontal”, “vertical”. “transverse”. “axial”, “circumferential”, and similar terms are used herein, it should be understood that these terms have reference only to the structure shown in the drawings as it would appear to a person viewing the drawings and are utilized only to facilitate describing the illustrative embodiments.

DETAILED DESCRIPTION OF THE INVENTION

A door lock is shown in the drawings and generally designated 10. Door lock 10 is configured to be mounted to a door for locking purposes. With reference to FIGS. 1-5 showing an embodiment according to the present invention, door lock 10 includes a latch device 20 and first and second operating devices 455 and 473 for operating latch device 20. Latch device 20 includes a case 22 having first and second sides 24 and 26 spaced from each other in a vertical direction and an end face between first and second sides 24 and 26. A faceplate 42 is mounted to the end face of case 22. Case 22 further includes a side 29 extending between first and second sides 24 and 26 and faceplate 42, defining a chamber 28 between first and second sides 24 and 26, faceplate 42, and side 29. Formed on side 29 and located in chamber 28 are first, second, and third axles 30, 32, and 34, two first pegs 36, and a second peg 37. Side 29 includes a first pivotal hole 38, a first screw hole 39, and a first engagement hole 40. Second and third axles 32 and 34 are located between first engagement hole 40 and first pivotal hole 38 in the vertical direction. Third axle 34 is located between first and second axles 30 and 32 in the vertical direction. First pivotal hole 38 is located between first axle 30 and first screw hole 39 in a transverse direction perpendicular to the vertical direction. Faceplate 42 includes first and second holes 44 and 46 in communication with chamber 28.

According to the form shown, a lid 217 is detachably mounted to an open side of case 22 to close chamber 28. Lid 217 includes a second pivotal hole 219 aligned with first pivotal hole 38 of case 22, a second screw hole 233 aligned with first screw hole 39 of case 22, and a second engagement hole 231 aligned with first engagement hole 40 of case 22.

Figure 8:
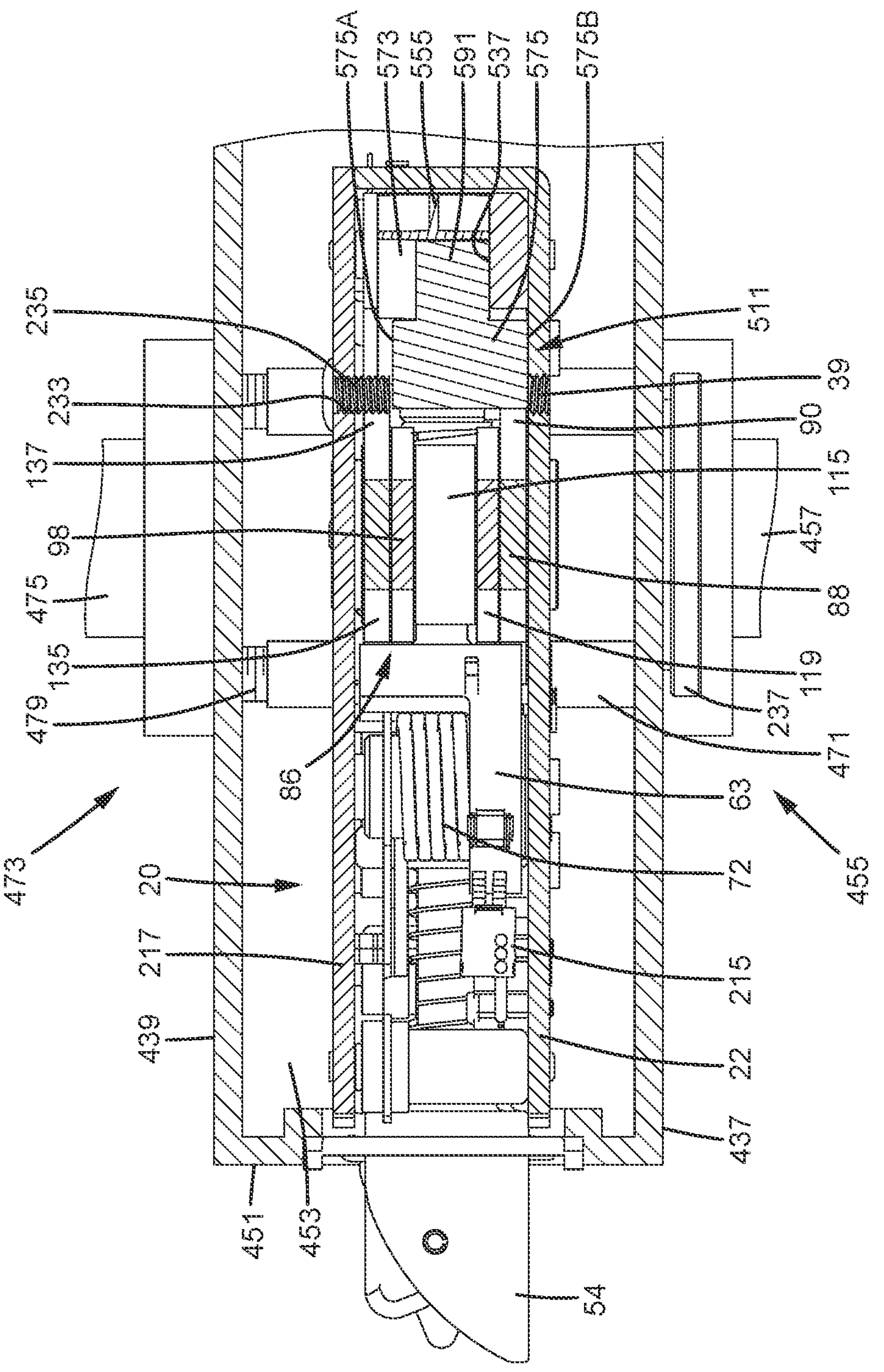
FIG. 8 is a cross sectional view taken along section line 8-8 of FIG. 5.
Figure 9:
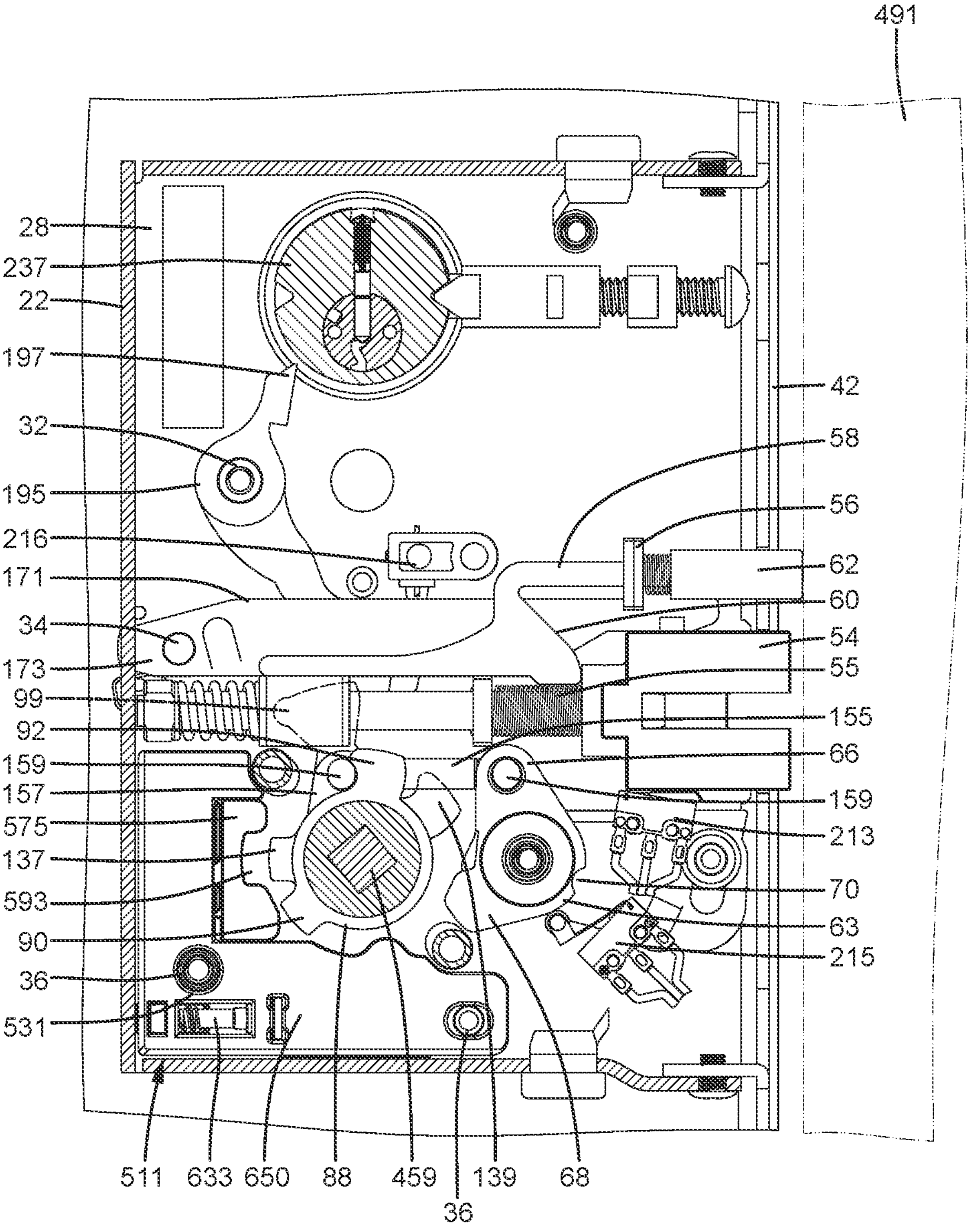
FIG. 9 is a view similar to FIG. 6 with a first handle of a first operating device of the door lock pivoted and with a latch moved from a latching position to an unlatching position.

According to the form shown, latch device 20 further includes a latch 54 slideably received in chamber 28 of case 22 and a safety bolt 62. A shank 50 is fixed to an end of latch 54. A first positioning plate 48 is fixed to side 29 of case 22. Shank 50 slideably extends through first positioning plate 48. A first spring 55 is mounted around shank 50 and is between latch 54 and first positioning plate 48. A connecting member 52 is mounted to a rear end of first positioning plate 48. Latch 54 is aligned with first hole 44 of faceplate 42. Thus, latch 54, shank 50, and connecting member 52 are jointly moveable between a latching position in which latch 54 extends beyond faceplate 42 (FIGS. 5, 6, and 8) and an unlatching position in which latch 54 retracts into case 22 and compresses first spring 55 (FIG. 9).

Figure 5:
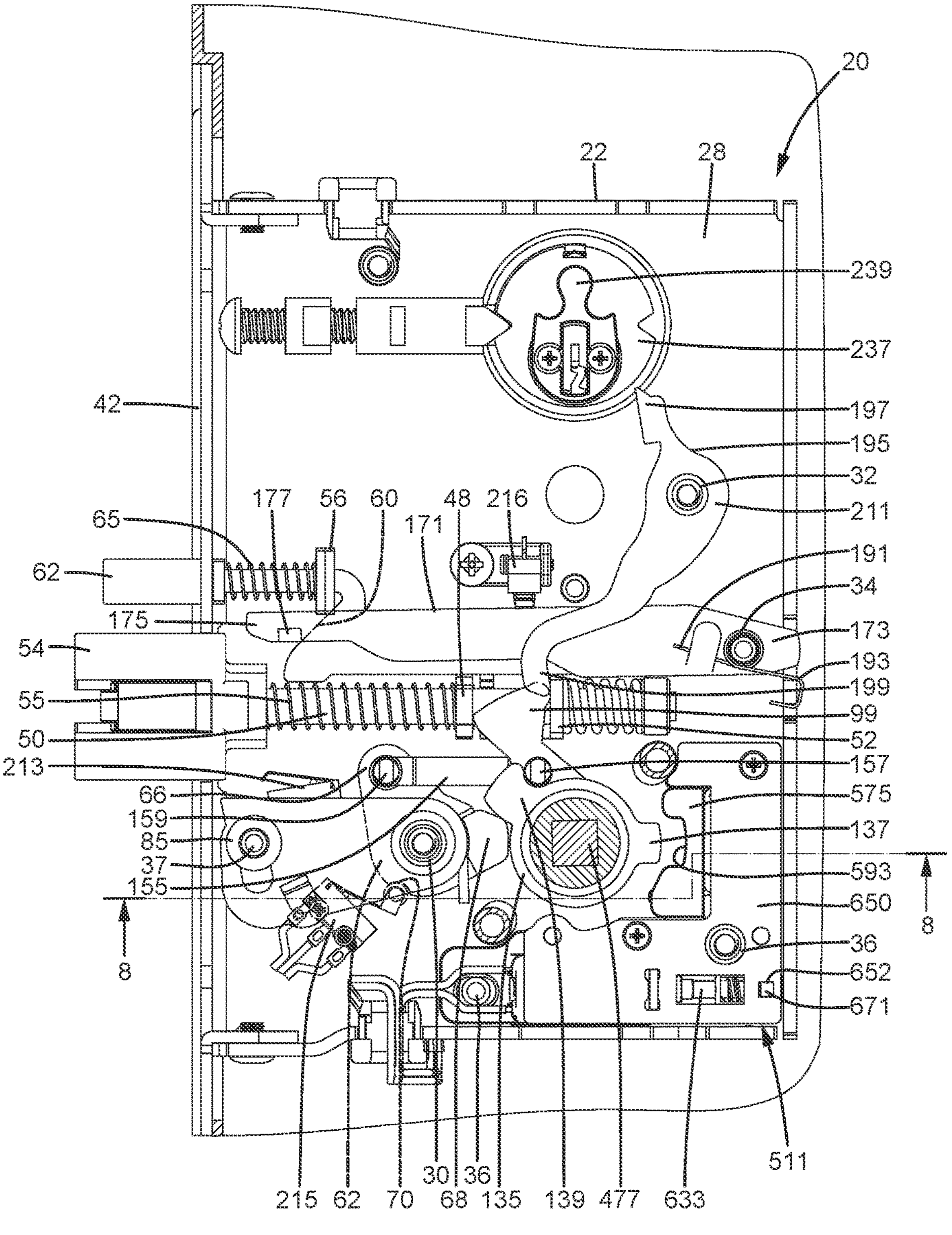
FIG. 5 is a cross sectional view taken along section line 5-5 of FIG. 4.

According to the form shown, a stem 58 is fixed to an end of safety bolt 62. Stem 58 includes a push face 60 on an intermediate portion thereof. Push face 60 is a slant in the form shown. A second positioning plate 56 is fixed to side 29 of case 22. Stem 58 slideably extends through second positioning plate 56. A second spring 65 is mounted around stem 58 and is located between safety bolt 62 and second positioning plate 56. Safety bolt 62 is aligned with second hole 46 of faceplate 42. Push face 60 of stem 58 is located behind latch 54 in the transverse direction (FIG. 5). Thus, when latch 54 is in the latching position, safety bolt 62 is biased by second spring 65 and is retained in a position extending beyond faceplate 42 (FIG. 5). When latch 54 moves from the latching position to the unlatching position, latch 54 presses against push face 60 to move safety bolt 62 in the transverse direction to a retracted position.

According to the form shown, latch device 20 further includes a returning member 63 pivotably mounted to first axle 30 of case 22. Returning member 63 includes a pivotal portion 64 on a side of returning member 63, a connecting end 66, and a stop portion 68. Pivotal portion 64 is tubular in the form shown. Connecting end 66 and stop portion 68 are spaced from each other in a circumferential direction about a first pivot axis defined by first axle 30. A recess 70 is formed in an outer periphery of returning member 63 and is located between connecting end 66 and stop portion 68 in the circumferential direction about the first pivot axis defined by first axle 30. Pivotal portion 64 of returning member 63 is pivotably connected to first axle 30. Thus, returning member 63 can pivot about the first pivot axis.

According to the form shown, a first torsion spring 72 is mounted around pivotal portion 64 of returning member 63. First torsion spring 72 includes a first tang 74 and a second tang 76 abutting stop portion 68 of returning member 63.

According to the form shown, latch device 20 further includes a positioning board 78 and an axle sleeve 85 which are received in chamber 28 of case 22. Positioning board 78 includes first and second fixing holes 80 and 82 spaced from each other. Positioning board 78 further includes an engagement portion 84 between first and second fixing holes 80 and 82. First fixing hole 80 receives pivotal portion 64 of returning member 63. Axle sleeve 85 is received in second fixing hole 82 and is mounted around second peg 37 of case 22. Thus, positioning board 78 can not rotate. First torsion spring 72 is located between returning member 63 and positioning board 78. First tang 74 of first torsion spring 72 engages with engagement portion 84 of positioning board 78. Furthermore, returning member 63 is biased by first torsion spring 72.

According to the form shown, latch device 20 further includes an unlatching mechanism 86 pivotably mounted between case 22 and lid 217. Unlatching mechanism 86 includes first and second driven rings 88 and 135 having an identical shape in the form shown. Unlatching mechanism 86 further includes first and second follower rings 98 and 119, a spacer plate 113, and a spacer ring 115, all of which are mounted between first and second driven rings 88 and 135. First driven ring 88 includes first and second protrusions 90 and 92 on an outer periphery thereof. First driven ring 88 further includes two bosses 94 on two sides thereof. Second driven ring 135 includes first and second projections 137 and 139 on an outer periphery thereof. Second driven ring 135 further includes two bosses 151 on two sides thereof. One of bosses 94 of first driven ring 88 is pivotably mounted in first pivotal hole 38 of case 22. One of bosses 151 of second driven ring 135 is pivotably received in second pivotal hole 219 of lid 217. hus, first and second rings 88 and 135 are aligned with each other.

Figure 10:
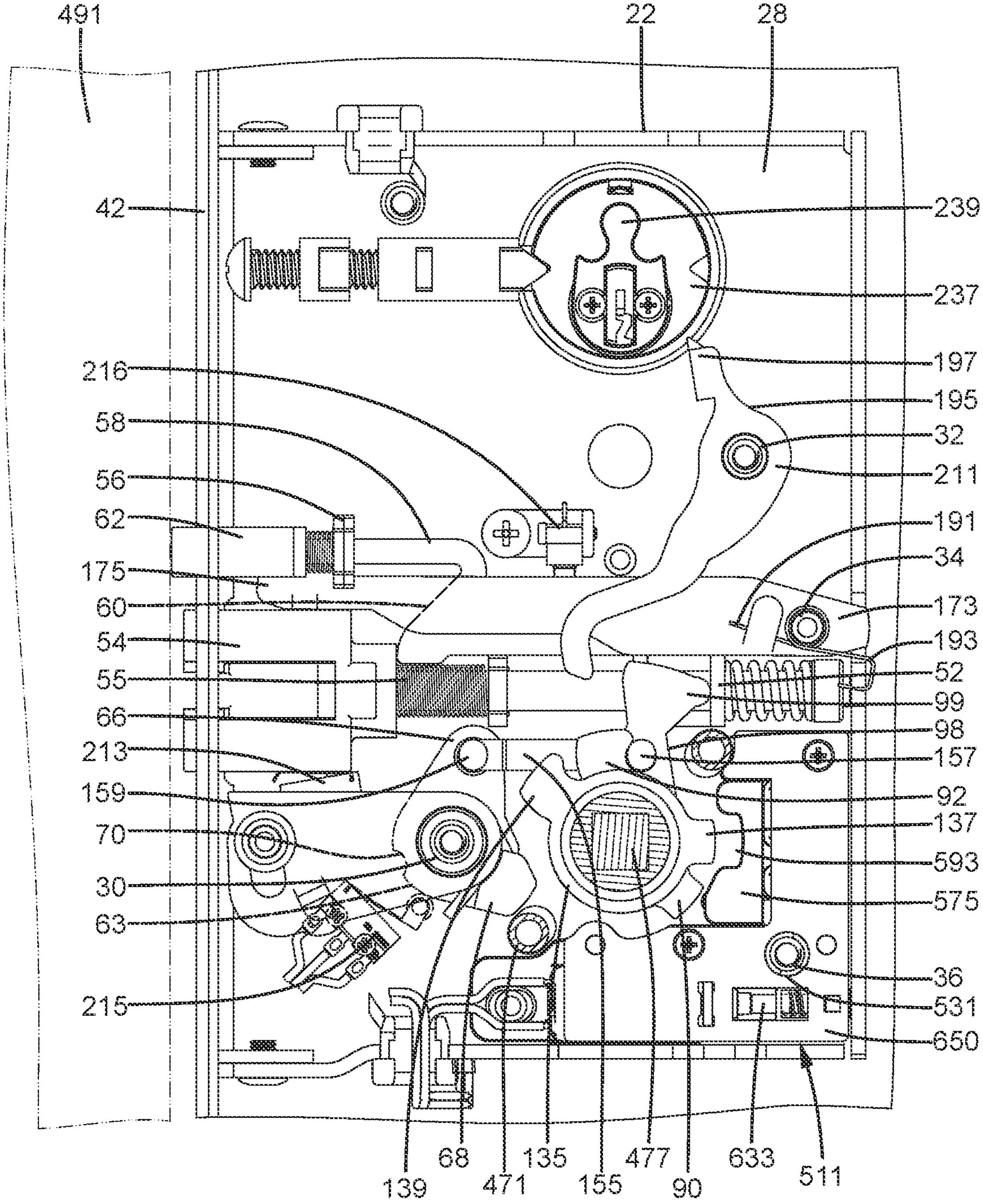
FIG. 10 is a view similar to FIG. 5A with a second handle of a second operating device of the door lock pivoted and with the latch moved from the latching position to the unlatching position.

A follower portion 99 is formed on an outer periphery of first follower ring 98 and includes a first engagement hole 117. The other boss 151 of second driven ring 135 is pivotably received in first follower ring 98. Second follower ring 119 includes a second engagement hole 131 spaced from a center of second follower ring 119 in a radial direction. The other boss 94 of first driven ring 88 is pivotably received in second follower ring 119. Follower portion 99 of first follower ring 98 abuts an inner face of connecting member 52 (FIG. 5). Spacer ring 115 is located between first and second follower rings 98 and 119. Spacer plate 113 is received in spacer ring 115. Thus, first follower ring 98 is pivotable about a pivot axis defined by first and second pivotal holes 38 and 219 between a release position (FIGS. 5 and 6) and a pressing position (FIGS. 9 and 10). When first follower ring 98 of unlatching mechanism 86 pivots, follower portion 99 of first follower ring 98 presses against and moves connecting member 52 in the transverse direction, moving latch 54 from the latching position to the unlatching position.

Figure 6:
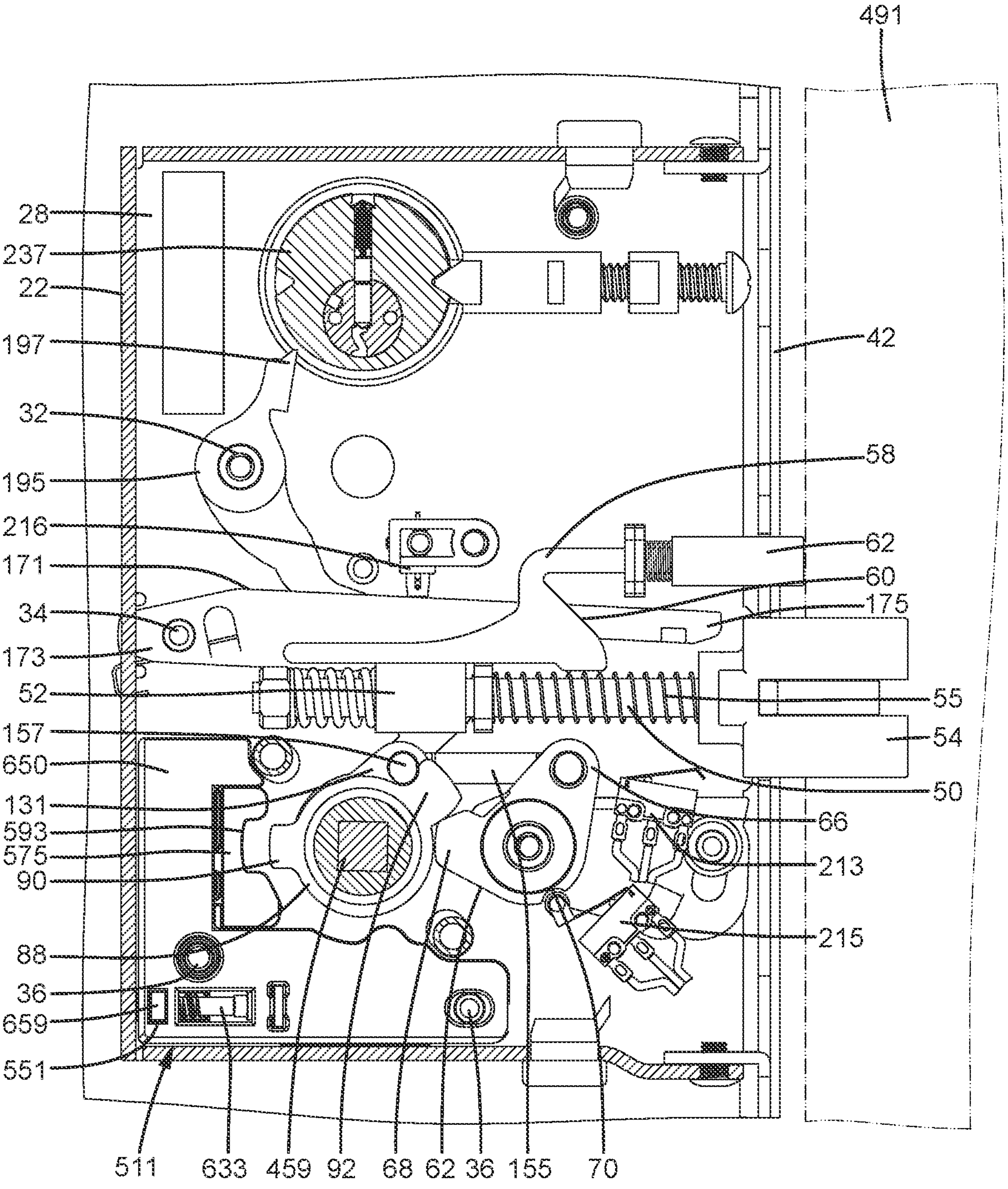
FIG. 6 is a cross sectional view taken along section line 6-6 of FIG. 4.

According to the form shown, latch device 20 further includes a bridging member 155. Bridging member 155 includes first engagement end 157 pivotably received in first engagement hole 117 of first follower ring 98 and second engagement hole 131 of second follower ring 119. Bridging member 155 further includes a second engagement end 159 pivotably connected to the connecting end 66 of returning member 63. When first driven ring 88 or second driven ring 135 of unlatching mechanism 86 pivots, second protrusion 92 of first driven ring 88 or second projection 139 of second driven ring 135 presses against first engagement end 157 of bridging member 155 to pivot first and second follower rings 98 and 119 from the release position to the pressing position. At the same time, bridging member 155 drives returning member 63 to pivot and to twist first torsion spring 72 by second tang 76, thereby creating a returning force. Thus, first torsion spring 72 can bias first follower ring 98 of unlatching mechanism 86 to the release position. When first follower ring 98 is in the release position, stop portion 68 of unlatching mechanism 86 abuts second protrusion 92 of first driven ring 88 and second projection 139 of second driven ring 135 (FIGS. 5 and 6).

According to the form shown, latch device 20 further includes an unlatching member 195 pivotably received in chamber 28 of case 22. Unlatching member 195 includes first and second ends 197 and 199 and a pivotal portion 211 between first and second ends 197 and 199. Pivotal portion 21 of unlatching member 195 is pivotably connected to second axle 32 of case 22. First end 197 of unlatching member 195 is located adjacent to first engagement hole 40 of case 22. Second end 199 of unlatching member 195 abuts the inner face of connecting member 52. Unlatching member 195 is pivotable about a second pivot axis defined by second axle 32. When unlatching member 195 pivots, connecting member 52 is pressed to move in the transverse direction by unlatching member 195, which, in turn, moves latch 54 from the unlatching position to the latching position.

According to the form shown, latch device 20 further includes a stop member 171 pivotably received in chamber 28 of case 22. Stop member 171 includes a pivotal end 173 and a stop end 175. Stop member 171 further includes a follower arm 177 on stop end 175 and located on a side of stop member 171. Pivotal end 173 of stop member 171 is pivotably connected to third axle 34 of case 22. Thus, stop member 171 is pivotable about a third pivot axis defined by third axle 34. A second torsion spring 179 is mounted around third axle 34 and abuts stop member 171. Second torsion spring 179 includes a first tang 191 engaged with stop member 171 and a second tang 193 engaged with case 22. Second torsion spring 179 biases stop end 175 of stop member 171 towards latch 54.

According to the form shown, latch device 20 further includes a locking mechanism 511 received in chamber 28 of case 22. Locking mechanism 511 includes a base 513 having a substantially L-shaped first portion 515 and a second portion 535. Base 513 further includes first and second sides 517 and 519, a groove 533 in first side 517 and in first portion 515, and a base coupling groove 551 extending from a bottom wall of groove 533 to second side 519. Furthermore, two positioning holes 531 extend from the bottom wall of groove 533 to second side 271. One of two positioning holes 531 is located between base coupling groove 551 and another of two positioning holes 531. Positioning holes 531 of base 513 respectively receive first pegs 36. First portion 515 of base 513 is located below unlatching mechanism 86 in the vertical direction. Second portion 535 is located between unlatching mechanism 86 and side 29 of case 22.

A cover plate 650 is mounted to first side 517 of base 513. Cover plate 650 includes a cover plate coupling groove 433 aligned with base coupling groove 551 of base 513.

According to the form shown, locking mechanism 511 includes a locking member 553 slideably received between base 513 and cover plate 650 and located in a track 537 which is located between second portion 535 and base coupling groove 551 of base 513. Locking member 553 is movable in the transverse direction. Locking member 553 includes a first unit 555 and a second unit 575 movable along the axial direction of first peg 36. First unit 555 includes two outer faces 557 spaced from each other and first and second front faces 559 and 571 extending between two outer faces 557. First front face 559 is spaced from second front face 571 in the transverse direction. First unit 555 further includes a sliding groove 573 extending from one of two outer faces 557 through another of two outer faces 557 and extending to second front face 571.

Figure 7:
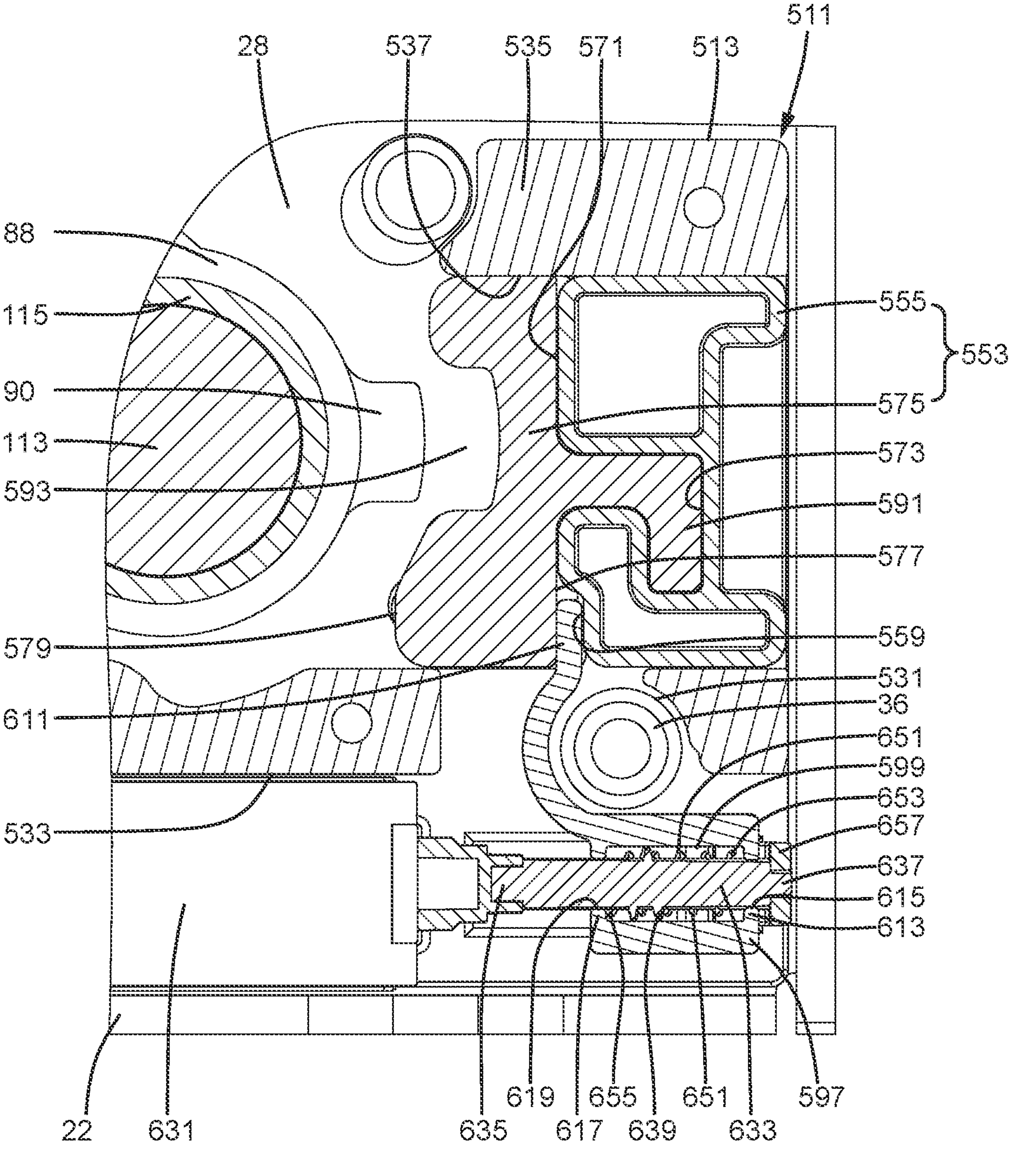
FIG. 7 is a cross sectional view taken along section line 7-7 of FIG. 4.

Second unit 575 includes first and second faces 575A and 575B spaced from each other in the axial direction of first peg 36. Second unit 575 further includes inner and outer faces 577 and 579 spaced from each other in the transverse direction. Second unit 575 further includes a sliding coupling portion 591 on inner face 577 and a locking groove 593 on outer face 579. Sliding coupling portion 591 of second unit 575 is slideably engaged in sliding groove 573 of first unit 555. First face 575A faces cover plate 650. Second face 575B faces case 22. A distance between first and second faces 575A and 575B of second unit 575 in the axial direction of first peg 36 is smaller than a distance between two outer faces 557 of first unit 555 in the axial direction of first peg 36. Thus, second unit 575 is movable in the axial direction of first peg 36 between a first alignment position (FIG. 8) abutting case 22 and a second alignment position (FIG. 13) abutting cover plate 650. Furthermore, first front face 559 of first unit 555 is spaced from inner face 577 of second unit 575 in the transverse direction. Furthermore, locking member 553 is limited by track 537 and is movable in the transverse direction between a front position (FIGS. 11 and 12) and a rear position (FIGS. 5-7). Locking groove 593 of second unit 575 is aligned with first protrusion 90 and first projection 137 respectively of first and second driven rings 88 and 135 in the transverse direction.

Locking mechanism 511 further includes a motor 6331, a shaft 633, and a supporting member 657. Motor 631 is mounted between base 513 and cover plate 650 and is located in groove 533. Supporting member 657 includes a first engaging portion 659 engaged with the base coupling groove 551 of base 513 and a second engaging portion 671 engaged with the cover plate coupling groove 652 of cover plate 650. Supporting member 657 further includes a pivotal portion 673 located between first and second engaging portions 659 and 671 and aligned with an axis of shaft 633.

Shaft 633 includes a driven end 635 and a supporting end 637 spaced from driven end 635 in the transverse direction. Shaft 633 further includes a threaded section 639 formed on an outer periphery of shaft 633 and located between supporting end 637 and driven end 635. It is worth noting that threaded section 639 has one or two turns (two turns in the illustrative embodiment). Driven end 635 of shaft 633 is coupled with and driven by motor 631. Supporting end 637 is rotatably coupled with pivotal portion 673 of supporting member 657. Thus, when motor 631 is activated, shaft 633 is driven by motor 631 to rotate. Furthermore, shaft 633 is limited by motor 631 and supporting member 657 to move in the transverse direction.

Locking mechanism 511 further includes an interlocking member 595. Interlocking member 595 includes a body 597 and a push end 611 extending outward from body 597. Body 597 includes a chamber 599 therein. Interlocking member 595 further includes first and second walls 613 and 617 which are symmetrically disposed and which are contiguous to chamber 599. First wall 613 includes a first pivotal groove 615 intercommunicating with chamber 599. Second wall 617 includes a second pivotal groove 619 intercommunicating with chamber 599.

Interlocking member 595 is slideably received between base 513 and cover plate 650. Push end 611 is received in a space between first front face 559 and inner face 577. Two sides of push end 611 respectively abut first front face 559 and inner face 577, such that interlocking member 595 and locking member 553 move jointly in the transverse direction. Furthermore, threaded section 639 of shaft 633 is located in chamber 599 of interlocking member 595 (FIGS. 7, 11, 15, and 16). First and second pivotal grooves 615 and 619 receive shaft 633. Driven end 635 of shaft 633 is located on an outer side of second wall 617 of interlocking member 595. Supporting end 637 of shaft 637 is located outside of first wall 613.

A helical elastic element 651 is mounted around shaft 633. Helical elastic element 651 includes a first tang 653 adjacent to first wall 613 and a second tang 655 adjacent to second wall 617. First and second tangs 653 and 655 tangentially extend from two ends of helical elastic element 651, respectively.

Helical elastic element 651 is received in chamber 599 and is in threading connection with threaded section 639. First and second tangs 653 and 655 abut inner walls of chamber 599. First tang 653 is located between first wall 613 and threaded section 639 in the transverse direction. Second tang 655 is located between second wall 617 and threaded section 633. Thus, helical elastic element 651 cannot rotate when shaft 633 rotates. Furthermore, rotation of shaft 633 causes threaded section 651 to push helical elastic element 651 to translate in the transverse direction. Thus, when helical elastic element 651 rotates in a direction (such as the forward direction), first tang 653 of helical elastic element 651 presses against first wall 613 of interlocking member 595, such that interlocking member 595 can move locking member 553 towards the rear position. On the other hand, when helical elastic element 651 rotates in a reverse direction (such as the rearward direction), second tang 655 of helical elastic element 651 presses against second wall 617 of interlocking member 595, such that interlocking member 595 can move locking member 553 towards the front position.

According to the form shown, in order to detect the status of latch device 20, a first sensor 213, a second sensor 215, and a third sensor 216 are mounted in chamber 28 of case 22. First sensor 213 is located below latch 54 in the vertical direction. When latch 54 is in the latching position, latch 54 is spaced from first sensor 213 (FIG. 5). When latch 54 is in the unlatching position, latch 54 presses against first sensor 213 (FIGS. 9 and 10). Second sensor 215 is located below returning member 63 in the vertical direction. When first follower ring 98 of unlatching mechanism 86 is in the release position, an activation rod of second sensor 215 is received in recess 70 of returning member 63 (FIG. 5). When first follower ring 98 of unlatching mechanism 86 is in the pressing position, recess 70 of returning member 63 disengages from the activation rod of second sensor 215, and returning member 63 presses against second sensor 215 (FIGS. 9 and 10). Third sensor 216 is located above stop member 171 in the vertical direction. When stop member 171 is in a non-blocking position, stop member 171 presses against third sensor 216. When stop member 171 is in the blocking position, stop member 171 does not press against third sensor 216. First, second, and third sensors 213, 215, and 216 can be electrically connected to a door access control system or a burglarproof system such that the door access control system or the burglarproof system can monitor the status of latch device 20.

Latch device 20 is mounted in a door 435. Door 435 includes first and second sides 437 and 439 and an end face 451 extending between first and second sides 437 and 439. Door 435 further includes an installation space 453 defined by first and second sides 437 and 439 and end face 451. Case 22 is received in installation space 453. Faceplate 42 is fixed to end face 451 of door 435. First operating device 455 is mounted to first side 437 of door 435. Second operating device 473 is mounted to second side 439 of door 435.

According to the form shown, first operating device 455 includes two mounting posts 471 extending through door 435 and case 22. First operating device 455 further includes a first spindle 459 and a first handle 457 connected to first spindle 459. First spindle 459 extends through first side 437 of door 435 and case 22 and is coupled to first driven ring 88, permitting joint pivotal movement of first driven ring 88 and first spindle 459. Thus, when first handle 457 is pivoted, first spindle 459 is driven to pivot first driven ring 88.

According to the form shown, second operating device 473 includes two bolts 479 extending through door 435 and threadedly engaged with mounting posts 471. Second operating device 473 includes a second spindle 477 and a second handle 475 connected to second spindle 477. Second spindle 477 extends through second side 439 of door 435 and lid 217 and is coupled to second driven ring 135, permitting joint pivotal movement of second driven ring 135 and second spindle 477. Thus, when second handle 475 is pivoted, second spindle 477 is driven to pivot second driven ring 135.

According to the form shown, door lock 10 further includes a lock cylinder 237. Lock cylinder 237 includes an actuating plate 239 pivotably mounted to an end thereof. In an example, lock cylinder 237 extends through first side 437 of door 435 and is in threading connection with first engagement hole 40. In another example, lock cylinder 237 extends through second side 439 of door 435 and is in threading connection with second engagement hole 231 of lid 217. Specifically, door 435 divides a space into an indoor space and an outdoor space. Lock cylinder 237 is generally mounted to the side facing the outdoor space. Locking mechanism 511 can accordingly be adjusted to locate second unit 575 in the first or second alignment position.

Now that the basic construction of door lock 10 has been explained, the operation and some of the advantages of door lock 10 can be set forth and appreciated. In particular, for the sake of explanation, it will be assumed that first side 437 of door 435 in FIGS. 1-12 is the outer side, and second side 439 of door 435 is the inner side. Lock cylinder 237 extends through first side 437 and is in threading connection with first engagement hole 40 of case 22. A switching screw 235 threadedly engages with second screw hole 233 of lid 217 and presses against first face 575A of second unit 575 of locking member 553 to bias second unit 575 to the first alignment position (FIG. 8). Thus, locking groove 593 of second unit 575 is aligned with first protrusion 90 of first driven ring 88 in the axial direction of first peg 36. Furthermore, locking groove 593 of second unit 575 is spaced from first projection 137 of second driven ring 135 in the axial direction of first peg 36.

FIG. 5 shows door 435 in an open position. Latch 54 is in the latching position. Safety bolt 62 extends beyond faceplate 42. Follower arm 177 of stop member 171 is stopped by push face 60 of stem 58 and is retained in the non-blocking position permitting movement of latch 54 from the latching position to the unlatching position. Locking member 553 is in the rear position. Locking groove 593 of locking member 553 is spaced from first protrusion 90 of first driven ring 88 and first projection 137 of second driven ring 135 in the transverse direction, permitting first handle 457 and second handle 475 to actuate first follower ring 98 from the release position to the pressing position. Thus, door lock 10 is set to be in an unlocking state. Furthermore, third sensor 216 is pressed when stop member 171 is in the non-blocking position, such that the door access control system or the burglarproof system can detect door 435 is in the open position.

Figure 5A:
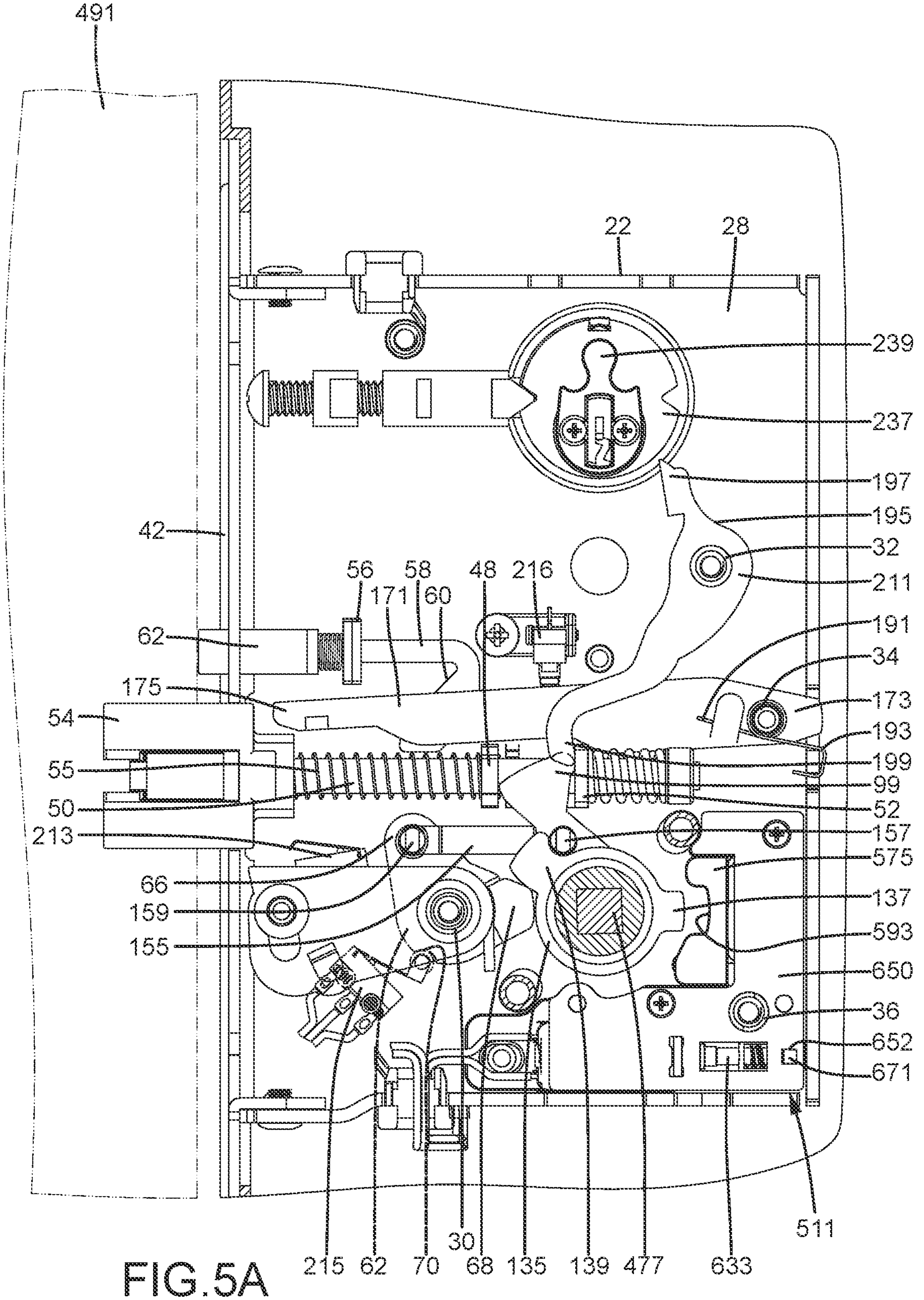
FIG. 5A is a view similar to FIG. 5 with the door in a closed position.

With reference to FIG. 5A, when door 435 is closed, latch 54 extends into a door frame 491 to which door 435 is mounted. Safety bolt 62 is pressed by door frame 491 and retracts into chamber 28 of case 22. Thus, stop member 171 is pressed by first tang 191 of second torsion spring 179 and pivots from the non-blocking position (FIG. 5) to the blocking position (FIG. 5A). Stop end 175 pivots to a movement path of latch 54 between the latching position and the unlatching position. Thus, picking of latch 54 via a gap between door 435 and door frame 491 is prevented. When stop member 171 is in the blocking position, third sensor 216 is not pressed, and the door access control system or the burglarproof system can detect door 435 is in the closed position.

In the state shown in FIG. 5A, locking member 553 of locking mechanism 511 is in the rear position, locking groove 593 is spaced from first protrusion 90 of first driven ring 88 in the transverse direction, and first driven ring 88 is pivotable. In this state, when first handle 457 of first operating device 455 pivots, first driven ring 88 is driven by first spindle 459, and second protrusion 92 of first driven ring 88 presses against and moves bridging member 155. Then, bridging member 155 actuates first and second follower rings 98 and 119 to pivot from the release position to the pressing position about the pivot axis defined by first and second pivotal holes 38 and 219. At the same time, bridging member 155 actuates returning member 63 to pivot about the first pivot axis defined by first axle 30 and to twist first torsion spring 72 by second tang 76 to create the returning force. Returning member 63 presses against second sensor 215, and the door access control system or the burglarproof system detects that somebody is opening door 435. Follower portion 99 of first follower ring 98 presses against shank 50 while first follower ring 98 of unlatching mechanism 86 pivots from the release position to the pressing position, and latch 54 moves from the latching position to the unlatching position. Connecting member 52 presses against stop member 171 while latch 54 moves from the latching position to the unlatching position, moving stop member 171 from the blocking position to the non-blocking position to permit movement of latch 54 from the latching position to the unlatching position. At the same time, latch 54 presses against push face 60 of stem 58 and actuates safety bolt 62 to retract into chamber 28 of case 22 while stop end 175 of stop member 171 is retained in the non-blocking position by latch 54. After first follower ring 98 of unlocking mechanism 86 has reached the pressing position, latch 54 is in the unlatching position (FIG. 9) permitting opening of door 435. Furthermore, first sensor 213 is pressed by latch 54 such that the door access control system or the burglarproof system detects that latched head 54 is in the unlatching position.

When first handle 457 of first operating device 455 is released after door 435 has been opened, first spring 55 biases latch 54 from the unlatching position to the latching position. At the same time, first torsion spring 72 biases returning member 63 to pivot and causes first and second follower rings 98 and 119 and first driven ring 88 to pivot from the pressing position to the release position, returning first handle 457 to the original, horizontal position. Since safety bolt 62 is not stopped by door frame 491, second spring 65 biases safety bolt 62 to extend beyond faceplate 42. Furthermore, push face 60 of stem 58 presses against follower arm 177 of stop member 171 to pivot stop member 171 from the blocking position to the non-blocking position.

In the state shown in FIG. 5A, since second unit 575 of locking member 553 of locking mechanism 511 is in the first alignment position, second driven ring 135 is pivotable. When second handle 475 of second operating device 473 pivots, second spindle 477 is actuated by second driven ring 135 to pivot, and second projection 139 of second driven ring 135 presses against first engagement end 157 of bridging member 155. Thus, bridging member 155 actuates first and second follower rings 98 and 119 to pivot from the release position to the pressing position about the pivot axis defined by first and second pivotal holes 38 and 219. At the same time, bridging member 155 actuates returning member 63 to pivot about the first pivot axis defined by first axle 30 and twists first torsion spring 72 by second tang 76 to create the returning force. Returning member 63 presses against second sensor 215, and the door access control system or the burglarproof system detects that somebody is opening door 435. Follower portion 99 of first follower ring 98 presses against shank 50 while first follower ring 98 of unlatching mechanism 86 pivots from the release position to the pressing position, and latch 54 moves from the latching position to the unlatching position. Connecting member 52 presses against stop member 171 while latch 54 moves from the latching position to the unlatching position, moving stop member 171 from the blocking position to the non-blocking position to permit movement of latch 54 from the latching position to the unlatching position. At the same time, latch 54 presses against push face 60 of stem 58 and actuates safety bolt 62 to retract into chamber 28 of case 22 while stop end 175 of stop member 171 is retained in the non-blocking position by latch 54. After first follower ring 98 of unlocking mechanism 86 has reached the pressing position, latch 54 is in the unlatching position (FIG. 10) permitting opening of door 435. Furthermore, first sensor 213 is pressed by latch 54 such that the door access control system or the burglarproof system detects that latched head 54 is in the unlatching position.

When second handle 475 of second operating device 473 is released after door 435 has been opened, first spring 55 biases latch 54 from the unlatching position to the latching position. At the same time, first torsion spring 72 biases returning member 63 to pivot and causes first and second follower rings 98 and 119 and first driven ring 88 to pivot from the pressing position to the release position, returning second handle 475 to the original, horizontal position. Since safety bolt 62 is not stopped by door frame 491, second spring 65 biases safety bolt 62 to extend beyond faceplate 42. Furthermore, push face 60 of stem 58 presses against follower arm 177 of stop member 171 to pivot stop member 171 from the blocking position to the non-blocking position.

Figure 11:
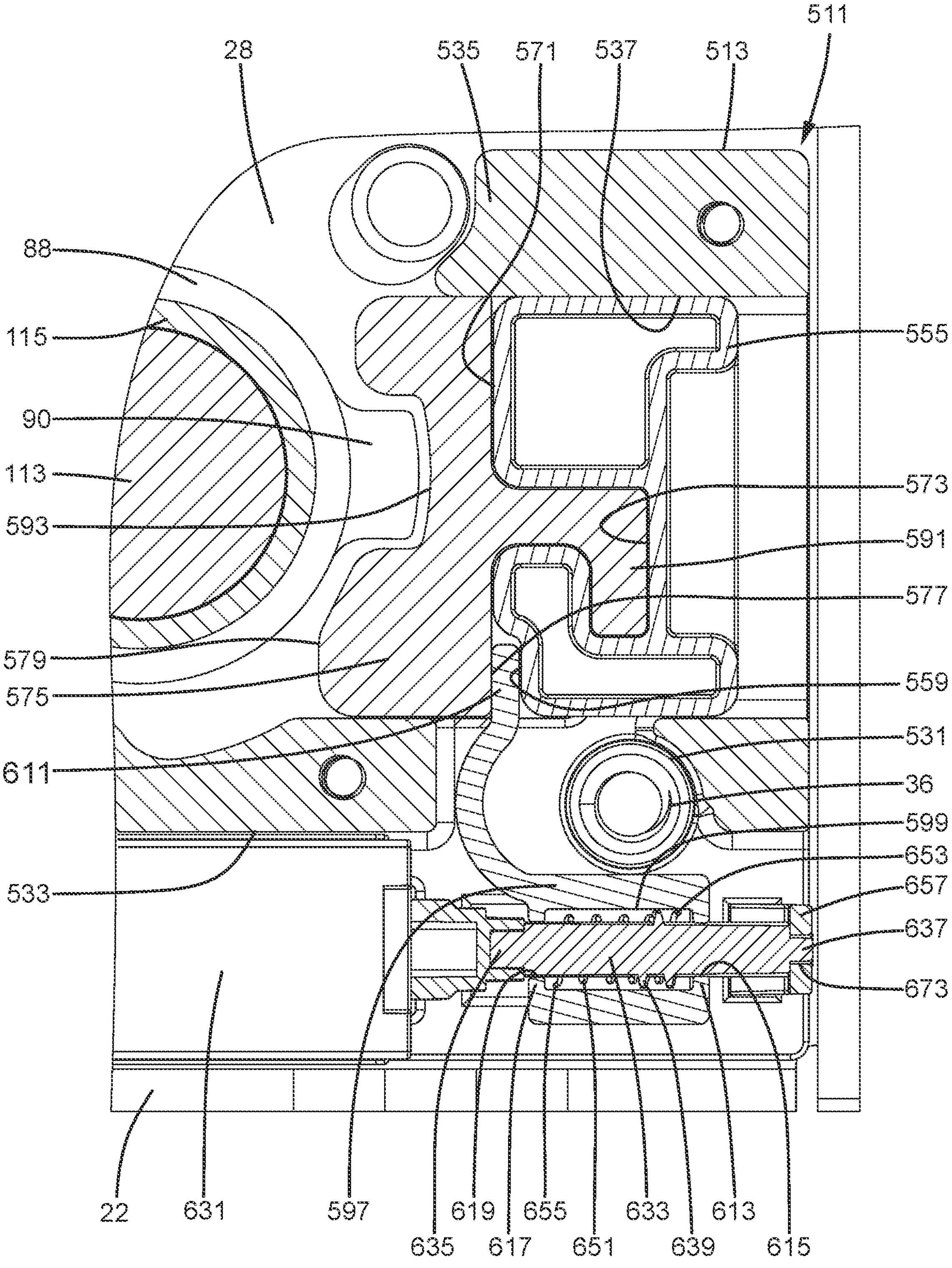
FIG. 11 is a view similar to FIG. 7 with a locking member moved from a rear position to a front position.
Figure 12:
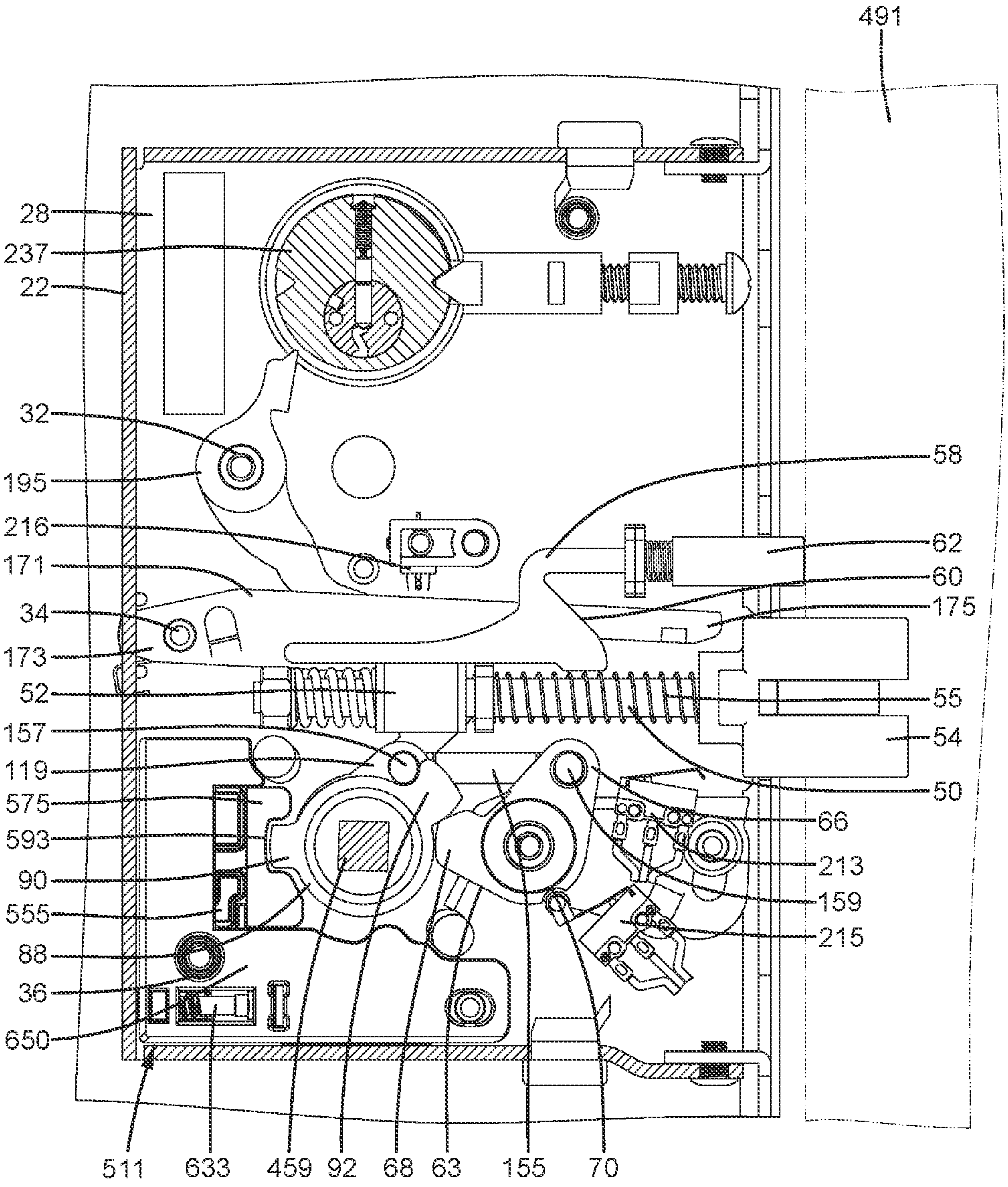
FIG. 12 is a view similar to FIG. 6 with the locking member moved from the rear position to the front position.

Still referring to FIG. 5A, when door 435 is closed, wired or wireless control can be used to activate motor 631 to thereby rotate shaft 633 in the forward direction. Specifically, when first follower ring 98 of unlatching mechanism 86 is in the release position, first protrusion 90 of first driven ring 88 and first projection 137 of second driven ring 135 are aligned with locking groove 593 of locking member 553. Thus, when shaft 633 rotates in the forward direction, threaded section 639 pushes helical elastic element 651 to move towards motor 631 in the transverse direction, such that second tang 655 of helical elastic element 651 presses against second wall 617 of interlocking member 595. Thus, helical elastic element 651 pushes interlocking member 651 to move towards motor 631 in the transverse direction. Push end 611 of interlocking member 595 presses against inner face 577 of second unit 575. Thus, locking member 553 and interlocking member 595 move jointly to cause movement of locking member 553 from the rear position (FIG. 5A) to the front position (FIGS. 11 and 12). When locking member 553 is in the front position, since second unit 575 is in the first alignment position, locking groove 593 of second unit 575 engages with first protrusion 90 of first driven ring 88 but does not engage with first projection 137 of second driven ring 135. Thus, first driven ring 88 cannot pivot about the pivot axis defined by first and second pivot holes 38 and 219. As a result, first handle 457 of first operating device 455 cannot pivot, and door lock 10 is set to be in a locking state. In this case, when it is desired to open door 435 from the outside, a key can be used to release the locking state of lock cylinder 237 and pivots actuating plate 239 to press against first end 197 of unlatching member 195, pivoting unlatching member 195 about the second pivot axis defined by second axle 32. Furthermore, second end 199 of unlatching member 195 presses against shank 50 to move latch 54 from the latching position to the unlatching position, and door 435 can be opened.

In a case that first operating device 455 cannot unlatch latch 54, since first projection 137 of second driven ring 135 does not engage with locking groove 593 of locking member 553, latch 54 can be moved from the latching position to the unlatching position by operating second handle 475 of second operating device 473.

When it is desired to release locking of first driven ring 88 by locking mechanism 511, motor 631 can be activated to rotate shaft 633 in the reverse direction. Threaded section 639 of shaft 633 pushes helical elastic element 651 away from motor 631 in the transverse direction. First tang 653 of helical elastic element 651 presses against first wall 613 of interlocking member 595, such that push end 611 of interlocking member 595 presses against first front face 559 of first unit 555. Thus, locking member 553 moves from the front position (FIGS. 12 and 14) towards the rear position (FIGS. 5 and 6). When the locking member 553 is in the rear position, locking groove 593 is disengaged from first protrusion 90 of first driven ring 88, permitting first driven ring 88 to pivot. As a result, first handle 457 of first operating device 455 can be operated to open door 435.

Figure 13:
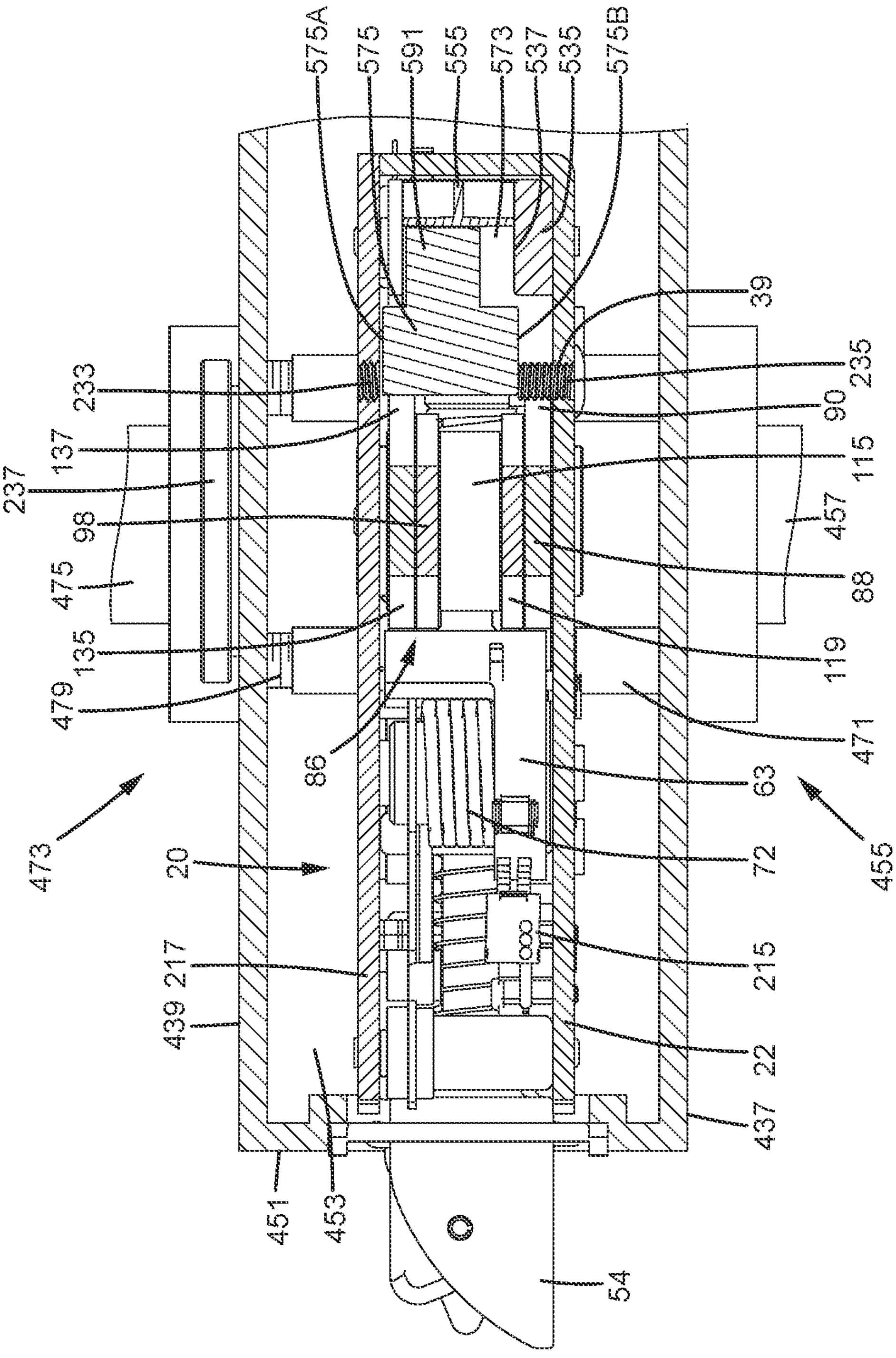
FIG. 13 is a view illustrating a switching screw coupled with a first screw hole, with the second unit biased to a second alignment position.
Figure 14:
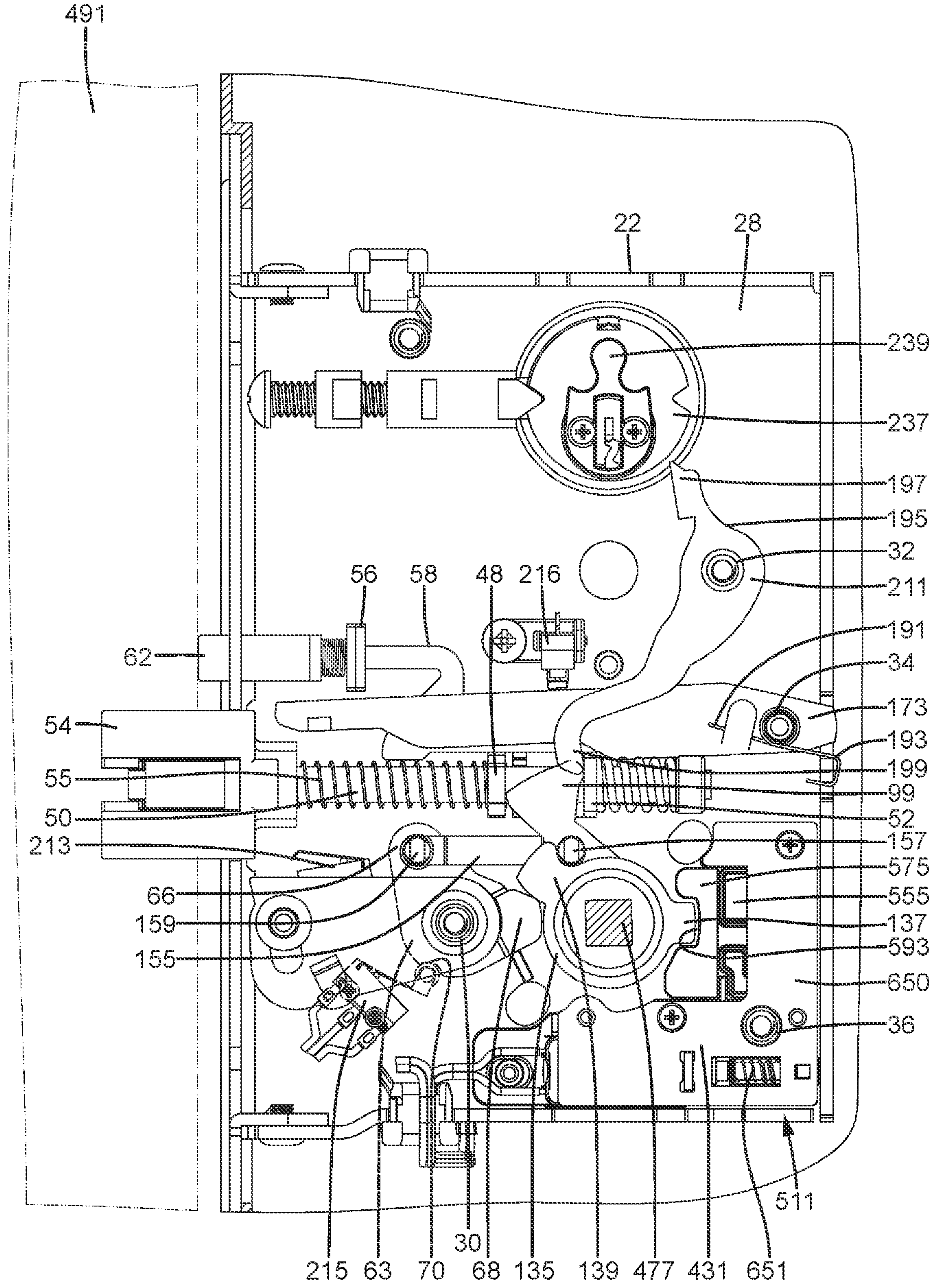
FIG. 14 is a view illustrating the second unit in the second alignment position and the locking member in the front position.
Figure 15:
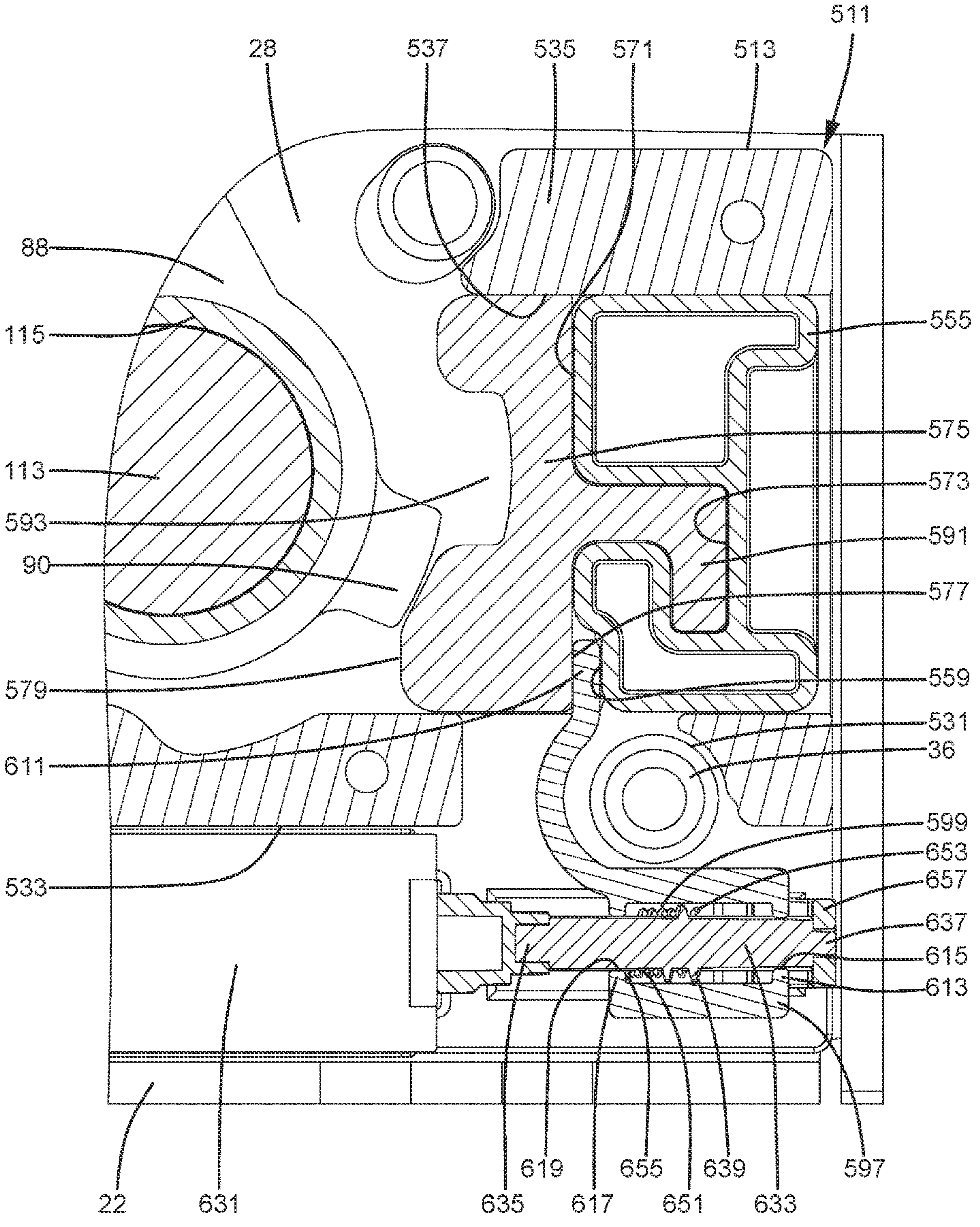
FIG. 15 is a view similar to FIG. 7 with the first handle pivoted to move the latch from the latching position to the unlatching position, with a shaft rotated in a forward direction, with the locking member remained in the rear position, and with a helical elastic element compressed.

With reference to FIGS. 13 and 14, in another case that first side 437 of door 435 is the inner side and second side 439 of door 435 is the outer side, lock cylinder 237 extends second side 439 of door 435 and threadedly engages with second engagement hole 231 of lid 217 (FIG. 13). Switching screw 235 extends through first screw hole 39 of case 22 and abuts second face 575B of second unit 575, such that second unit 575 is biased to the second alignment position. Thus, locking groove 593 of locking member 553 is aligned with first projection 137 of second driven ring 135 in the axial direction of first peg 36 and is spaced from first protrusion 90 of first driven ring 88 in the axial direction of first peg 36.

With reference to FIG. 14, when door 435 is closed and when locking member 553 is in the front position, first projection 137 of second driven ring 135 engages with locking groove 593 of locking member 553, such that second driven ring 135 cannot pivot. Furthermore, second handle 475 cannot pivot. Thus, a user can not open door 435 by operating second operating device 473. When it is desired to open door 435 from the outside, a key is used to pivot actuating plate 239 to move latch 54 from the latching position to the unlatching position while compressing first spring 55.

While second operating device 473 cannot unlatch latch 54, since first driven ring 88 does not engage with locking member 553, door 435 can be opened by operating first handle 457 of first operating device 455 to move latch 54 from the latching position to the unlatching position.

In addition to the locking function provided by locking mechanism 511, door lock 10 permits mistaken operation. Specifically, when door lock 10 is in a state shown in FIG. 10, latch 54 is in the unlatching position, second unit 575 is in the first alignment position, and first protrusion 90 of first driven ring 88 is not aligned with locking groove 593 of locking member 553. Since first protrusion 90 of first driven ring 88 is in the movement path of locking member 553 from the rear position to the front position, when shaft 633 is driven to rotate in the forward direction, locking member 553 is stopped by first protrusion 90 of first driven ring 88 and, thus, cannot move from the rear position to the front position. In the state shown in FIG. 15, when shaft 633 rotates in the forward direction, helical elastic element 651 moves toward motor 631 in the transverse direction and cannot push the interlocking member 595 to move. Thus, rotation of threaded section 639 causes compression of a portion of helical elastic element 651 between threaded section 639 and second wall 617 in the transverse direction. Furthermore, another portion of helical elastic element 651 between threaded section 639 and first wall 613 is not compressed. Namely, locking member 553 cannot move from the rear position to the front position. As a result, compressible helical elastic element 651 can still move in the transverse direction, such that shaft 633 will not get stuck and is still rotatable in the forward direction. Note that the mistaken operation is also effective when second unit 575 is in the second alignment position.

Figure 16:
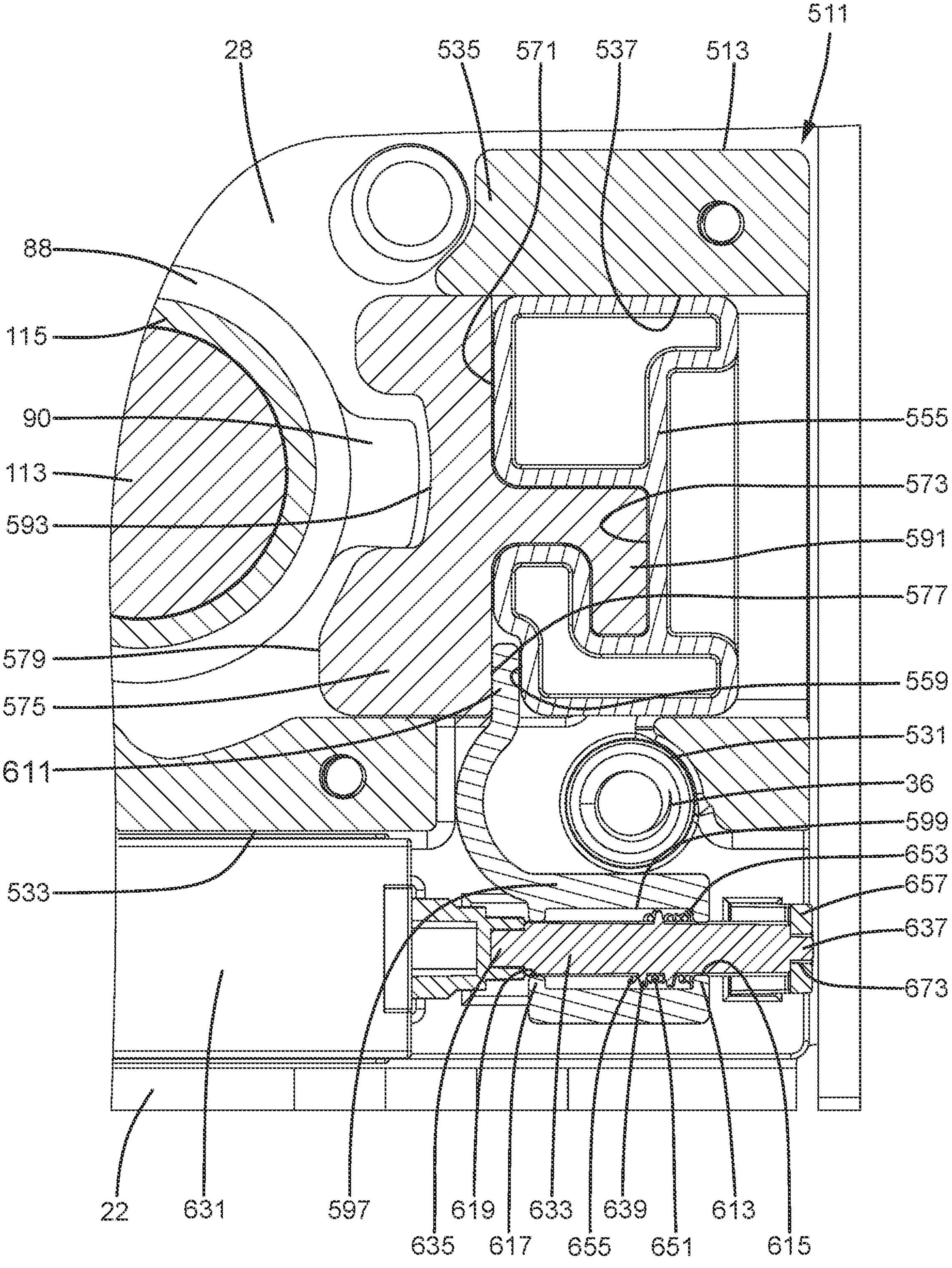
FIG. 16 is a view similar to FIG. 11 with the locking member retained in place and with the shaft rotated in a reverse direction to compress the helical elastic element.

Locking mechanism 511 further permits another mistaken operation. Specifically, referring to FIGS. 5 and 7, when locking member 553 is in the rear position, when motor 631 drives shaft 633 to rotate in the reverse direction, helical elastic element 651 moves away from motor 631 in the transverse direction. Since locking member 553 in the rear position cannot continue to move away from motor 631, first tang 653 of helical elastic element 651 cannot push interlocking member 595 to move. With reference to FIG. 16, rotation of shaft 633 in the reverse direction causes helical elastic element 651 to move away from motor 631 in the transverse direction as well as compression of the portion of helical elastic element 651 between threaded section 639 and first wall 613 in the transverse direction. Namely, when locking member 553 is not movable, helical elastic element 651 is movable in the transverse direction and the portion of helical elastic element 651 between threaded section 639 and first wall 613 is compressible, such that shaft 633 will not get stuck and is still rotatable in the reverse direction.

Locking mechanism 511 permits wired or wireless control to activate motor 631, controlling locking member 553 to be in the front position (in which door lock 10 is set to be in the locking state) or the rear position (in which door lock 10 is set to be in the unlocking state), which is advantageous to cooperate with a control system, such as a door access control system or a burglarproof system.

Locking mechanism 511 permits mistaken operation. Namely, when locking member 553 cannot move, motor 631 can still be activated to rotate shaft 633 in either of the forward direction and reverse direction, preventing motor 631 from being damaged by the resistance. Furthermore, assume shaft 633 rotates in the forward or reverse direction while locking member 553 cannot move, since helical elastic element 651 is compressed, when the factor of blocking of locking member 553 vanishes (such as release of first handle 457 or second handle 475, which is on the outer side), bias of helical elastic element 651 causes movement of interlocking member 595, which, in turn, moves locking member 553 to the predetermined, controlled rear position or front position, avoiding unreliable setting of door lock 10 in the locking or unlocking state due to mistaken operation.

Furthermore, second unit 575 of locking mechanism 511 can rapidly be mounted to be in the first alignment position or the second alignment position according to the indoor and outdoor positions of the site on which door lock 10 is mounted, providing highly convenience in installation of door lock 10.

Furthermore, locking mechanism 511 is simple in the overall structure thereof, which means a lower damage possibility and simpler manufacture and processing of parts. Furthermore, the time required for assembly can be effectively shortened, reducing the overall manufacturing costs.

Now that the basic teachings of the present invention have been explained, many extensions and variations will be obvious to one having ordinary skill in the art. For example, first and second units 555 and 575 of locking member 553 can be integral, such that locking member 553 is a single component. In this case, locking groove 593 of locking member 553 can only set to be aligned with first protrusion 90 of first driven ring 88 or first projection 137 of second driven ring 135. Namely, it is necessary to design two locking members 553 for different needs in assembly, and such a simple modification is still within the scope of the invention.

Thus since the illustrative embodiments disclosed herein may be embodied in other specific forms without departing from the spirit or general characteristics thereof, some of which forms have been indicated, the embodiments described herein are to be considered in all respects illustrative and not restrictive. The scope is to be indicated by the appended claims, rather than by the foregoing description, and all changes which come within the meaning and range of equivalency of the claims are intended to be embraced therein.

The invention claimed is:

1. A door lock permitting electric locking and unlocking, comprising:

a case;

a latch slideably received in the case, wherein the latch is movable between a latching position and an unlatching position;

an unlatching mechanism including a first driven ring and a second driven ring, wherein the first driven ring and the second driven ring are independently and operatively connected to the latch;

a first operating device disposed on a side of the case and operatively connected to the first driven ring, wherein the first operating device is operable to pivot the first driven ring to thereby move the latch from the latching position to the unlatching position;

a second operating device disposed on another side of the case and operatively connected to the second driven ring, wherein the second operating device is operable to pivot the second driven ring to thereby move the latch to the latching position or the unlatching position;

a base securely mounted in the case;

a first unit slideably mounted on the base, wherein the first unit is movable between a front position and a rear position;

a second unit engageable with the first unit to move jointly, wherein the second unit is movable relative to the first unit between a first alignment position in which the second unit is aligned with the first driven ring and is spaced from the second driven ring and a second alignment position in which the second unit is aligned with the second driven ring and is spaced from the first driven ring, wherein when the first unit is in the rear position, the first and second operating devices and the first and second driven rings are permitted to move the latch to the unlatching position, wherein when the first unit is in the front position and the second unit is in the first alignment position, the first operating device and the first driven ring are not permitted to move the latch to the unlatching position, whereas the second operating device and the second driven ring are permitted to move the latch to the unlatching position, wherein when the first unit is in the front position and the second unit is in the second alignment position, the second operating device and the second driven ring are not permitted to move the latch to the unlatching position, whereas the first operating device and the first driven ring are permitted to move the latch to the unlatching position;

a motor mounted on the base;

a shaft operatively coupled with the motor and including a threaded section on an outer periphery of the shaft;

an interlocking member movably mounted on the base, wherein the interlocking member is operatively coupled with the first and second operating units, such that movement of the interlocking member causes movement of the first and second units to the front position or the rear position; and a helical elastic element non-rotatably mounted around the outer periphery of the shaft and in threading connection with the threaded section, wherein the helical elastic element is operatively coupled with the interlocking member, such that rotation of the shaft causes movement of the helical elastic element in an axial direction of the shaft, and the interlocking member is pushed to move in the axial direction of the shaft;

wherein the first unit includes two outer faces spaced from each other and a sliding groove extending from one of the two outer faces through the other of the two outer faces, wherein the first unit further includes a first front face and a second front face, wherein the sliding groove extends to the second front face of the first unit, wherein the second unit further includes an outer face and an inner face, wherein the second unit further includes a sliding coupling portion slideably coupled with the sliding groove, wherein the first front face of the first unit is spaced from the inner face of the second unit, wherein the second front face of the first unit abuts the inner face of the second unit, wherein the interlocking member includes a push end abutting the inner face of the second unit and the first front face of the first unit, and wherein the second unit in the second alignment position is between the two outer faces of the first unit.

2. The door lock permitting electric locking and unlocking as claimed in claim 1, wherein the first driven ring includes a first protrusion on an outer periphery thereof, wherein the second driven ring includes a first projection on an outer periphery thereof, wherein the second unit includes a locking groove on the outer face, wherein when the first unit is in the front position and the second unit is in the first alignment position, the first protrusion of the first driven ring engages with the locking groove, such that the first driven ring is not pivotable, and wherein when the first unit is in the front position and the second unit is in the second alignment position, the first projection of the second driven ring engages with the locking groove, such that the second driven ring is not pivotable.

3. The door lock permitting electric locking and unlocking as claimed in claim 1, wherein the interlocking member includes a body and a push end extending outward from the body, wherein the body includes a chamber receiving the threaded section of the shaft, wherein the helical elastic element is located in the chamber, and wherein the push end is operatively coupled with the first unit and the second unit.

4. The door lock permitting electric locking and unlocking as claimed in claim 3, wherein the interlocking member further includes first and second walls which are symmetrically disposed and which are contiguous to the chamber, wherein the first wall includes a first pivotal groove receiving the shaft, wherein the second wall includes a second pivotal groove receiving the shaft, wherein the threaded section of the shaft is located between the first and second walls, wherein the threaded section has one or two turns, wherein the helical elastic element includes a first tang and a second tang tangentially extend from two ends of helical elastic element, respectively, wherein the first tang is located between the first wall and the threaded section in the transverse direction, wherein the second tang is located between the second wall and the threaded section in the transverse direction, wherein the first and second tangs abut inner walls of the chamber, such that the helical elastic element cannot rotate, wherein when the first tang presses against the first wall, the first and second units are permitted to move towards the rear position, wherein when the second tang presses against the second wall, the first and second units are permitted to move towards the front position, wherein when the shaft rotates and the interlocking member is not movable in the transverse direction, a portion of the helical elastic element between the threaded section and the first wall is compressed or another portion of the helical elastic element between the threaded section and the second wall is compressed.

5. The door lock permitting electric locking and unlocking as claimed in claim 1, further comprising a supporting member mounted to the base and spaced from the interlocking member in the axial direction of the shaft, wherein the supporting member includes a pivotal portion, wherein the shaft includes a driven end coupled with the motor to rotate therewith and a supporting end rotatably coupled with the pivotal portion of the supporting member, wherein the threaded section is located between the driven end and the supporting end, and wherein the driven end and the supporting end are located outside of the interlocking member.

* * * * *